US012128610B2

(12) United States Patent
Fang et al.

(10) Patent No.: US 12,128,610 B2
(45) Date of Patent: Oct. 29, 2024

(54) SYSTEMS, DEVICES, AND METHODS FOR KALEIDOSCOPIC 3D PRINTING

(71) Applicant: Massachusetts Institute of Technology, Cambridge, MA (US)

(72) Inventors: Nicholas Fang, Lexington, MA (US); Jordan Handler, Shaker Heights, OH (US); Seok Kim, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 524 days.

(21) Appl. No.: 17/299,517

(22) PCT Filed: Dec. 12, 2019

(86) PCT No.: PCT/US2019/065989
§ 371 (c)(1),
(2) Date: Jun. 3, 2021

(87) PCT Pub. No.: WO2020/123810
PCT Pub. Date: Jun. 18, 2020

(65) Prior Publication Data
US 2022/0001601 A1 Jan. 6, 2022

Related U.S. Application Data

(60) Provisional application No. 62/778,595, filed on Dec. 12, 2018.

(51) Int. Cl.
*B29C 64/129* (2017.01)
*B29C 64/232* (2017.01)
(Continued)

(52) U.S. Cl.
CPC .......... *B29C 64/129* (2017.08); *B29C 64/232* (2017.08); *B29C 64/286* (2017.08); *B33Y 10/00* (2014.12); *B33Y 30/00* (2014.12)

(58) Field of Classification Search
None
See application file for complete search history.

(56) References Cited

U.S. PATENT DOCUMENTS

2009/0290891 A1   11/2009  Sievers
2018/0015672 A1    1/2018  Shusteff et al.
2018/0327715 A1   11/2018  Espinosa-Hoyos et al.

FOREIGN PATENT DOCUMENTS

WO   WO-2018013829 A1 * 1/2018 ........... B29C 64/112

OTHER PUBLICATIONS

Raman et al., "High-Resolution Projection Microstereolithography for Patterning of Neovasculature. Advanced Healthcare Materials," 5: 610-619. doi: 10.1002/adhm.201500721, (2016).
(Continued)

*Primary Examiner* — Robert J Grun
(74) *Attorney, Agent, or Firm* — Barnes & Thornburg, LLP

(57) ABSTRACT

Systems and methods for improved stereolithographic (SLA) three-dimensional printing are provided. The systems and methods utilize an array-lens to produce kaleidoscopic imaging patterns, which in turn are used to direct the curing of resin to produce a three-dimensional object. The array-lens can be used to replicate, superposition, and/or overlap or otherwise reconstruct an image received by the array-lens, onto a resin that is used to form the desired object. The systems and methods can further use an optical diffuser, with a distance between the optical diffuser and the array-lens being adjustable to provide a desired kaleidoscopic imaging pattern on the resin. Additional features and methods for use with the provided SLA three-dimensional printing systems and methods are also provided.

14 Claims, 11 Drawing Sheets

(51) Int. Cl.
B29C 64/286 (2017.01)
B33Y 10/00 (2015.01)
B33Y 30/00 (2015.01)

(56) References Cited

OTHER PUBLICATIONS

Reshetouski et al., "Three-dimensional kaleidoscopic imaging," CVPR 2011, Colorado Springs, CO, USA, 353-360 (2011).
Schultz, "3D Printing Phosphonium Ionic Liquid Networks with Mask Projection Microstereolithography," ACS Macro Lett., 2014, 3 (11), pp. 1205-1209.
Shusteff et al., "One-step volumetric additive manufacturing of complex polymer structures," Sci. Adv. 3, eaao5496 (2017).
Shusteff, "Projection Microstereolithography for Architected Materials," Lawrence Livermore National Laboratory, LLNL-TR-666552, 2015.
Soman, "Three-dimensional scaffolding to investigate neuronal derivatives of human embryonic stem cells," Biomed Microdevices (2012) 14:829-838.
Song et al., "A review of micromirror arrays," Precision Engineering 51, 729-761, (2018).
Sreedhara et al., "3D printed feed spacers based on triply periodic minimal surfaces for flux enhancement and biofouling mitigation in RO and UF," Desalination 425, 12-21 (2018).
Stuerzebecher et al., "Advanced mask aligner lithography: Fabrication of periodic patterns using pinhole array mask and Talbot effect," Opt. Express 18, 19485-19494 (2010).
Sun et al., "Calculating model of light transmission efficiency of diffusers attached to a lighting cavity," Opt. Express 18, 6137-6148 (2010).
Sun et al., "Projection micro-stereolithography using digital micromirror dynamic mask," Sensors and Actuators A 121, 113-120 (2005).
Sun et al., "The influences of the material properties on ceramic micro-stereolithography," Sensors and Actuators A 101, 364-370 (2002).
Texas Instruments, "DLP660TE," http://www.ti.com/product/DLP660TE.
Tumbleston, "Continuous liquid interface production of 3D objects," Science Mar. 20, 2015: vol. 347, Issue 6228, pp. 1349-1352.
Urrios, "3D-printing of transparent bio-microfluidic devices in PEG-DA," Lab Chip, 2016, 16,2287.
Vitale et al., "A Unified Approach for Patterning via Frontal Photopolymerization," Adv. Mater. 27, 6118-6124 (2015).
Waldbaur, A, "Maskless Projection Lithography for the Fast and Flexible Generation of Grayscale Protein Patterns," Small, 8: 1570-1578. doi:10.1002/smll.201102163 (2012).
Wu et al., "Optimization design of irradiance array for LED uniform rectangular illumination," Appl. Opt. 51, 2257-2263 (2012).
Xiao et al., "Advances in three-dimensional integral imaging: sensing, display, and applications [Invited]," Appl. Opt. 52, 546-560 (2013).
Yang, "Rapid Fabrication of Hydrogel Microstructures Using UV-Induced Projection Printing," Micromachines 2015, 6, 1903-1913; doi:10.3390/mi6121464.
Yoo, "Porous scaffold design using the distance field and triply periodic minimal surface models," Biomaterials 32, 7741-7754 (2011).
Zhang et al., "Kaleidoscopic imaging patterns of complex structures fabricated by laser-induced deformation," Nature Communications 7, 13743 (2016).
Zhang et al., "Rapid Fabrication of Complex 3D Extracellular Microenvironments by Dynamic Optical Projection Stereolithography," Adv. Mater., 24: 4266-4270, (2012).
Zheng et al., "Design and optimization of a light-emitting diode projection micro-stereolithography three-dimensional manufacturing system," Review of Scientific Instruments 83, 125001 (2012).
Zheng et al., "Multiscale metallic metamaterials," Nature Materials 15, 1100-1106 (2015).
Zheng, "Ultralight, Ultrastiff Mechanical Metamaterials," Science Jun. 20, 2014: vol. 344, Issue 6190, pp. 1373-1377.
Zhou et al., "Additive Manufacturing of a 3D Terahertz Gradient-Refractive Index Lens," Advanced Optical Materials, 4: 1034-1040, (2016).
Zhou et al., "Three-dimensional Printing for Catalytic Applications: Current Status and Perspectives," Adv. Funct. Mater. 1701134 (2017).
Zhou et al., "Digital material fabrication using mask-image-projection based stereolithography," Rapid Prototyping Journal, vol. 19 Iss 3 pp. 153-165, (2013).
Zhou, "Hiding a realistic object using a broadband terahertz invisibility cloak," Sci Rep. 2011;1:78. doi: 10.1038/srep00078. Epub Sep. 1, 2011.
"Projection Microfabrication of Three-Dimensional Scaffolds for Tissue Engineering," Journal of Manufacturing Science and Engineering Apr. 2008, vol. 130.
Arai et al., "Gradient-index lens-array method based on real-time integral photography for three-dimensional images," Appl. Opt. 37, 2034-2045 (1998).
Asiga Freeform Pico 2, https://www.asiga.com/products/printers/pico2/.
Biomed Microdevices (2009) 11: 1309-1315, "3D microfabricated bioreactor with capillaries".
Carbon M1 Printer, https://www.carbon3d.com/.
Chen et al., "Flexible Octopus-Shaped Hydro gel Particles for Specific Cell Capture," small 12, 2001-2008 (2016).
Chen et al., "Generation of optical crystals and quasicrystal beams: Kaleidoscopic patterns and phase singularity," Phys. Rev. A 83, 053813 (2011).
Chen et al., "Illumination distribution and signal transmission for indoor visible light communication with different light-emitting diode arrays and pre-equality circuits," Optical Engineering 54, 115106 (2015).
Choi, "Cure depth control for complex 3D microstructure fabrication in dynamic mask projection microstereolithography," Rapid Prototyping Journal, vol. 15, (2009).
DB9 Creator, https://www.b9c.com/.
Dong et al., "Micronanofabrication of assembled three-dimensional microstructures by designable multiple beams multiphoton processing," Appl. Phys. Lett. 91, 124103 (2007).
Emamia et al., "Scanning-projection based stereolithography: Method and structure," Sensors and Actuators A 218, 116-124 (2014).
Ember, https://ember.autodesk.com/overview#tech_specs.
Envision Perfactory, https://envisiontec.com/3d-printers/desktop-3d-printers/.
Epson, "PowerLite Pro Cinema 4855WU WUXGA 3LCD Projector Kit," https://epson.com/For-Home/ProiectorsiPro-Cinema/PowerLite-Pro-Cinema-4855WU-WUXGA-3LCD-Proiector-Kit/p/V11H543120MB.
Espinosa-Hoyos et al., "Engineered 3D-printed artificial axons," Scientific Reports 8,478 (2018).
Fang et al., "Diffusion-limited photopolymerization in scanning micro-stereolithography," Appl. Phys. A 79, 1839 (2004).
Ge et al., "Multimaterial 4D Printing with Tailorable Shape Memory Polymers," Sci. Rep. 6, 31110; doi: 10.1038/srep31110 (2016).
Gissibl et al., "Two-photon direct laser writing of ultracompact multi-lens objectives. Nat. Photonics," 10, 554-560 (2016).
Gong, "Optical approach to resin formulation for 3D printed microfluidics," RSC Adv., 2015, 5, 106621.
Gonidec et al., "Fabrication of Nonperiodic Metasurfaces by Microlens Projection Lithography," Nano Lett. 16, 4125-4132 (2016).
Hayasaki et al., "Variable holographic femtosecond laser processing by use of a spatial light modulator," Appl. Phys. Lett. 87, 031101 (2005).
He et al., "Generation of Customizable Micro-wavy Pattern through Grayscale Direct Image Lithography," Scientific Reports 6, 21621 (2016).
International Search Report and Written Opinion for Application No. PCT/US2019/065989, mailed Feb. 24, 2020 (10 pages).

(56) References Cited

OTHER PUBLICATIONS

Januszewicz, "Layerless fabrication with continuous liquid interface production," Proc Natl Acad Sci U S A. Oct. 18, 2016; 113(42): 11703-11708.

JBD, "Amu LED MicroLED Displays," https://www.jb-display.com/0-13-panel.

Jeyachandran, "Maskless Ultraviolet Projection Lithography with a Biorepelling Monomolecular Resist," J. Phys. Chem. C, 2015, 119 (1), pp. 494-501.

Journal of Materials Processing Technology 209 (2009) 5494-5503, "Fabrication of 3D biocompatible/biodegradable micro-scaffolds using dynamic mask projection microstereolithography".

Jung, "Programmable gradational micropatterning of functional materials using maskless lithography controlling absorption," Scientific Reports 5, Article No. 15629 (2015).

Kang et al., "A pixel based solidification model for projection based stereolithography," Sensors and Actuators A 178, 223-229 (2012).

Kato et al., "Multiple-spot parallel processing for laser micronanofabrication" Appl. Phys. Lett. 86, 044102 (2005).

Kelly et al., "Computed Axial Lithography (CAL): Toward Single Step 3D Printing of Arbitrary Geometries," arXiv: I705.05893v1 [cs.GR] (2017).

Kim et al., "Scalable additive manufacturing via integral image formation," ARXIV Pre-Print, 2019 [Online]. Available at: https://arxiv.org/abs/1911.11817, (32 pages).

Kim, "3D Optical Printing of Piezoelectric Nanoparticle Polymer Composite Materials," ACS Nano, 2014, 8 (10), pp. 9799-9806.

Krodel et al., "Microlattice Metamaterials for Tailoring Ultrasonic Transmission with Elastoacoustic Hybridization," Phys. Rev. Applied 6, 064005 (2016).

Kudo3D Titan, https://www.kudo3d.com/titan2-and-titan2-hr/.

Lawrence Livermore National Laboratory, Large-Area Projection Micro-Stereolithography (LAPµSL), LLNL-MI-670797, https://ipo.llnl.gov/content/assets/docs/award-archive/lapusl.pdf.

Lazarev et al., "LCOS spatial light modulators: trends and applications," in Optical Imaging and Metrology (Wiley-VCR, 2012), pp. 1-29.

Lee et al., "Controlled Unusual Stiffness of Mechanical Metamaterials," Scientific Reports 6, 20312 (2016).

Lee et al., "Cure depth in photopolymerization: Experiments and theory," J. Mater. Res. 16, 3536-3544 (2001).

Lee, "Development of a 3D printer using scanning projection stereolithography," Sci Rep. Apr. 23, 2015;5:9875. doi: 10.1038/srep09875.

Li et al., "Microfabrication on a curved surface using 3D microlens array projection," J. Micromech. Microeng. 19, 105010 (2009).

Limaye et al., "Process planning method for mask projection micro-stereolithography," Rapid Prototyping Journal, vol. 13 Issue: 2, pp. 76-84.

Macdonald, "Comparing Microfluidic Performance of Three-Dimensional (3D) Printing Platforms," Anal. Chem. 2017, 89, 3858-3866.

Malinauskas et al., "Ultrafast laser processing of materials: from science to industry," Light: Science & Applications 5, e16133 (2016).

Manakov et al., "Reconfigurable Camera Add-On for High Dynamic Range, Multispectral, Polarization, and Light-Field Imaging," ACM Trans. Graph. 32, 4 (Proc. SIGGRAPH) (2013).

Melchels et al., "Mathematically defined tissue engineering scaffold architectures prepared by stereolithography," Biomaterials 31, 6909-6916 (2010).

MII Craft, http://www.miicraft.com/product/.

Moreno et al., "Designing light-emitting diode arrays for uniform near-field irradiance," Appl. Opt. 45, 2265-2272 (2006).

Na, "Grayscale gel lithography for programmed buckling of non-Euclidean hydrogel plates," Royal Society of Chemistry, 2016.

\* cited by examiner

SYSTEMS, DEVICES, AND METHODS FOR KALEIDOSCOPIC 3D PRINTING

RELATED APPLICATIONS

This application is a U.S. national stage filing from International Application Number PCT/US19/65989, filed Dec. 12, 2019, and entitled "Systems, Devices, and Methods for Kaleidoscopic 3D Printing," which claims priority to and the benefit of U.S. Provisional Application No. 62/778,595, filed Dec. 12, 2018, and entitled "Systems, Devices, and Methods for Kaleidoscopic 3D Printing," the contents of each which is hereby incorporated by reference in their entireties.

FIELD

The present disclosure relates to systems, devices, and methods for volumetric three-dimensional printing, and more particularly relates to the use of an array-lens and kaleidoscopic imaging to provide for scalable lithographic three-dimensional printing.

BACKGROUND

Scalable lithographic patterning in three-dimensional (3D) printing enables the scalable manufacturing of a wide range of architected 3D microstructures, including artificial tissue and engineered surfaces. From planar lithography to additive manufacturing, coupling lithographic patterning with photopolymerization can offer complex structures by sequential stacking of multiple layers. This photopolymerization process is known as stereolithography (SLA), and its applications include use with scanning optics, projection optics, and volumetric multibeam-based holographic optics. However, such optical technologies suffer from low scalability and/or the restricted ability to fabricate a small feature sizes of complex microstructures.

Different approaches have been investigated to implement scalable SLA without losing feature resolution. A multiple-focal spot method has been approached to extend the fabrication area of two-photon polymerization SLA. Such approaches add some capability to increase the fabrication area in a single exposure and reduce the resulting printing time. Additionally, mechanical scanning systems have been explored to expand total fabrication area by incorporating stage movement or a scanning optics module. However, despite advances in multiple-focal spot configurations and scanning modules, the imaging optics of SLA have remained a conventional one-to-one imaging system (i.e., single-lens imaging system). This has limited the potential of scalable SLA due to the intrinsic lithographic scaling law of one-to-one imaging systems. Accordingly, the multi-foci method is still limited in scalability because serial process necessitated by their point source and scanning methods require many repeated cycles until the whole area is covered. Furthermore, the total fabrication area is divided into a large number of subareas as the target feature size decreases.

Still further, 3D printing has been traditionally accomplished in a layer-by-layer manner, whether through fused deposition, laser sintering, or light-curing techniques. Innovations to speed up printing have come about, such as those that utilize projection-style patterning to cure entire layers at once. Carbon 3D has developed a means of curing parts somewhat continuously (versus the layer-by-layer approach), although the part is still printed along an axis and the technology itself loses some of its effectiveness for parts with large surface areas due to adhesion forces. Only recently has the idea of a volumetric approach taken hold, whereas a complex 3D part is cured nearly instantaneously. To the extent others have tried volumetric additive manufacturing that uses a spatial light modulator to modify the phase and/or intensity of a laser beam or the like to create a patterned profile, the phase or intensity modulation approach associated with such techniques can be costly and complex.

Accordingly, there is a need for 3D printing systems and methods and methods that are scalable to allow for large-scale, efficient printing without an undesirable loss of quality of the printed object.

SUMMARY

The present disclosure provides for improved ways for performing stereolithographic three-dimensional (3D) printing such that it produces objects more quickly, of a finer quality, and in a more scalable manner. It relies upon, among other components, a combination of a microdisplay device that generates an image(s), and an array-lens that replicates the image(s) to project a plurality of images that form kaleidoscopic imaging pattern on a resin that will form the three-dimensionally printed object. More specifically, an individual lens unit of the array-lens outputs an image, and the lens array, through some combination of replication, superposition, and/or reconstruction, produces the kaleidoscopic imaging pattern(s). The resin can then be selectively cured, for example on a layer-by-layer basis, based on the kaleidoscopic imaging pattern(s), to form the three-dimensionally printed object.

A key aspect of the disclosed systems and methods is a shift from systems and methods that use a one-to-one imaging to systems and methods of array-to-array imaging that use an array-lens to introduce scalable printing at tens of centimeter$^2$ (cm$^2$) scales without requiring specialized instruments such as scanning optics modules or mechanical stages. Moreover, this approach expands on projection-based SLA to multiply small feature sizes of several micrometer (µm) scales with a versatile kaleidoscopic imaging system that reconstructs patterns over a large area.

In some of the embodiments that utilize kaleidoscopic imaging herein an optical system can utilize aligned mirrors, and/or other reflecting components known to those skilled in the art, to merge multiple reflections into a composite image. As provided for herein, an array-lens acts as an image multiplier through kaleidoscopic imaging with image replication and multi-viewed image reconstruction capabilities. In view of the present disclosure, an engineered projection-based printing system enables digitally controlled kaleidoscopic imaging patterns that leverage the interplay of an array-lens and microdisplay device. The capabilities of this approach can be illustrated by embedding unique imaging capabilities of array-lens into conventional projection-based SLA systems.

In one exemplary embodiment, a system for three-dimensional printing includes an image generator, an optical diffuser, an array-lens, a chamber configured to have a curable resin disposed in it, and a curing component. The image generator is configured to project one or more images onto the optical diffuser. The array-lens is configured to receive the one or more images projected onto the optical diffuser and replicate at least one image of the one or more images to create a plurality of output images. The array-lens is further configured to project the plurality of output images into the chamber to produce a kaleidoscopic imaging pattern on a curable resin disposed in the chamber. The curing component is configured to cure the curable resin disposed in the chamber such that a resulting three-dimensional printed object is printed based on the kaleidoscopic imaging pattern produced on the curable resin disposed in the chamber.

The system for three-dimensional printing can be configured to allow a distance between the optical diffuser and the array-lens to be adjustable. In some such instances, the system can include an adjustable stage to which the array-lens can be coupled. The adjustable stage can be configured to move the array lends longitudinally to adjust the distance along a z-axis between the optical diffuser and the array-lens.

The array-lens, or diffractive imaging elements, can be further configured to superposition the plurality of output images and/or overlap the plurality of output images on the curable resin disposed in the chamber to produce the kaleidoscopic imaging pattern on the curable resin. The kaleidoscopic imaging pattern can include periodical imaging patterns. In some embodiments, the array-lens can include a plurality of lenses, with each lens of the plurality of lenses being configured to generate an image of the plurality of output images. Notably, to the extent "each lens" of the plurality of lenses is configured in this fashion, this does not necessarily mean that each and every lens of the array-lens is configured in this fashion. Rather, it instead requires that at least two lenses of the plurality of lenses is configured in this fashion. Of course, in some instances, each and every lens of the array-lens can be configured in this fashion. The image of the plurality of images generated by each lens of the plurality of lenses can be a reduced size in comparison to a corresponding image projected by the image generator.

In some embodiments the system can be further configured such that the array-lens is configured to produce a plurality of kaleidoscopic imaging patterns over time on a curable resin disposed in the chamber, and the curing component is configured to cure the curable resin disposed in the chamber such that the resulting three-dimensional printed object is printed based on the plurality of kaleidoscopic imaging patterns produced on the curable resin disposed in the chamber. The curing component can be configured to cure the resin in a layer-by-layer manner to form the resulting three-dimensional printed object. In some instances, the resin can be photochemically and/or photo-thermally activated.

The system can include a reflector. The reflector can be disposed between the image generator and the optical diffuser, and it can be configured to reflect one or more images form the image generator to the optical diffuser. In some such embodiments, the reflector includes at least one of a mirror, a prism, or a phase array. For example, the reflector can include a plurality of mirrors configured to merge multiple reflections of the one or more images to produce the kaleidoscopic imaging pattern.

In some embodiments the system can include a controller. For example, the controller can be a digital controller configured to operate the image generator and/or the array-lens such that the kaleidoscopic imaging pattern is a digitally controlled kaleidoscopic imaging pattern. By way of further example, the controller can be configured to control the curing component to selectively cure parts of a volume of the curable resin disposed in the chamber based on the kaleidoscopic imaging pattern. The one or more images projected by the image generator can include an array, and the plurality of output images can include an output array such that the system provides for array-to-array imaging.

The three-dimensional printed object that results from the present disclosure can include a plurality of microfiber arrays. Arrays of the plurality of microfiber arrays having a diameter approximately in the range of about 1 micrometer to about 20 micrometers. In some such embodiments, a surface area of the resulting three-dimensional printed object on which the plurality of microfiber arrays are disposed can be approximately in the range of about 625 millimeters$^2$ to about 2500 millimeters$^2$.

The chamber can be configured to remain stationary while the resulting three-dimensional printed object is formed. The system for three-dimensional printing can be devoid of scanning optics modules.

In one exemplary embodiment of a method for three-dimensional printing, the method includes projecting one or more images onto an image input plane (e.g., a diffuser or optical diffuser). The method further includes replicating at least one image of the one or more images projected onto the image input plane to produce a kaleidoscopic imaging pattern, projecting the kaleidoscopic imaging pattern onto a curable resin, and curing the curable resin to form a three-dimensional object based on the kaleidoscopic imaging pattern.

In some embodiments, projecting the kaleidoscopic imaging pattern onto a curable resin can include projecting a plurality of output images onto the curable resin by performing superposition the plurality of output images and/or overlap the plurality of output images. Replicating at least one image of the one or more images onto the image input plane can be performed by a lens array, and the method can include adjusting a distance between the image input plane and the lens array to produce the kaleidoscopic imaging pattern at a desired resolution and size. Alternatively, or additionally, a distance between the image input plane and/or the input object size can be adjusted to produce the kaleidoscopic imaging pattern at a desired resolution and size. Further alternatively, or additionally, the action of replicating at least one image of the one or more images projected onto the image input plane to produce a kaleidoscopic imaging pattern can include replicating at least one image of the one or more images projected onto the image input plane to produce a plurality of kaleidoscopic imaging patterns. Further, the action of projecting the kaleidoscopic imaging pattern onto a curable resin can include projecting the plurality of kaleidoscopic imaging patterns onto the curable resin. Still further, the action of curing the curable resin to form a three-dimensional object based on the kaleidoscopic imaging pattern can include curing the curable resin in a layer-by-layer manner to form the three-dimensional object based on the plurality of kaleidoscopic imaging patterns.

The action of projecting one or more images onto an image input plane can also include reflecting the one or more image onto the image input plane. In some embodiments, the method can include digitally controlling projecting one or more images onto an image input plane and/or replicating at least one image of the one or more images projected onto the image input plane to produce a kaleidoscopic imaging pattern.

In some embodiments, projecting one or more images onto an image input plane further comprises projecting an array, and the kaleidoscopic imaging pattern produced by replicating at least one image of the one or more images projected onto the image input plane can include an output array such that the method entails array-to-array imaging.

The curable resin can be disposed in a stationary chamber throughout performance of the method. In some embodiments, the resulting three-dimensional object can include a plurality of microfiber arrays. Arrays of the plurality of microfiber arrays can have a diameter approximately in the range of about 1 micrometer to about 20 micrometers. Alternatively, or additionally, a surface area of the resulting three-dimensional object can be approximately in the range of about 625 millimeters$^2$ to about 2500 millimeters$^2$.

BRIEF DESCRIPTION OF DRAWINGS

This disclosure will be more fully understood from the following detailed description taken in conjunction with the accompanying drawings, in which.

DETAILED DESCRIPTION

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, the present disclosure includes some illustrations and descriptions that include prototypes or bench models. A person skilled in the art will recognize how to rely upon the present disclosure to integrate the techniques, systems, devices, and methods provided for into a product, such as a consumer-ready, factory-ready, or lab-ready three-dimensional printer.

Systems and methods for improved stereolithographic (SLA) three-dimensional (3D) printing include the use of an array-lens to project kaleidoscopic images onto a resin from which the printed object will be formed. The array-lens replicates a received image(s), and can superposition and/or reconstruct the replicated image, onto the resin to form a kaleidoscopic imaging pattern. The resin can then be cured based on the projected kaleidoscopic imaging pattern, for instance on a layer-by-layer basis, to create the desired 3D object.

Figure 1A:
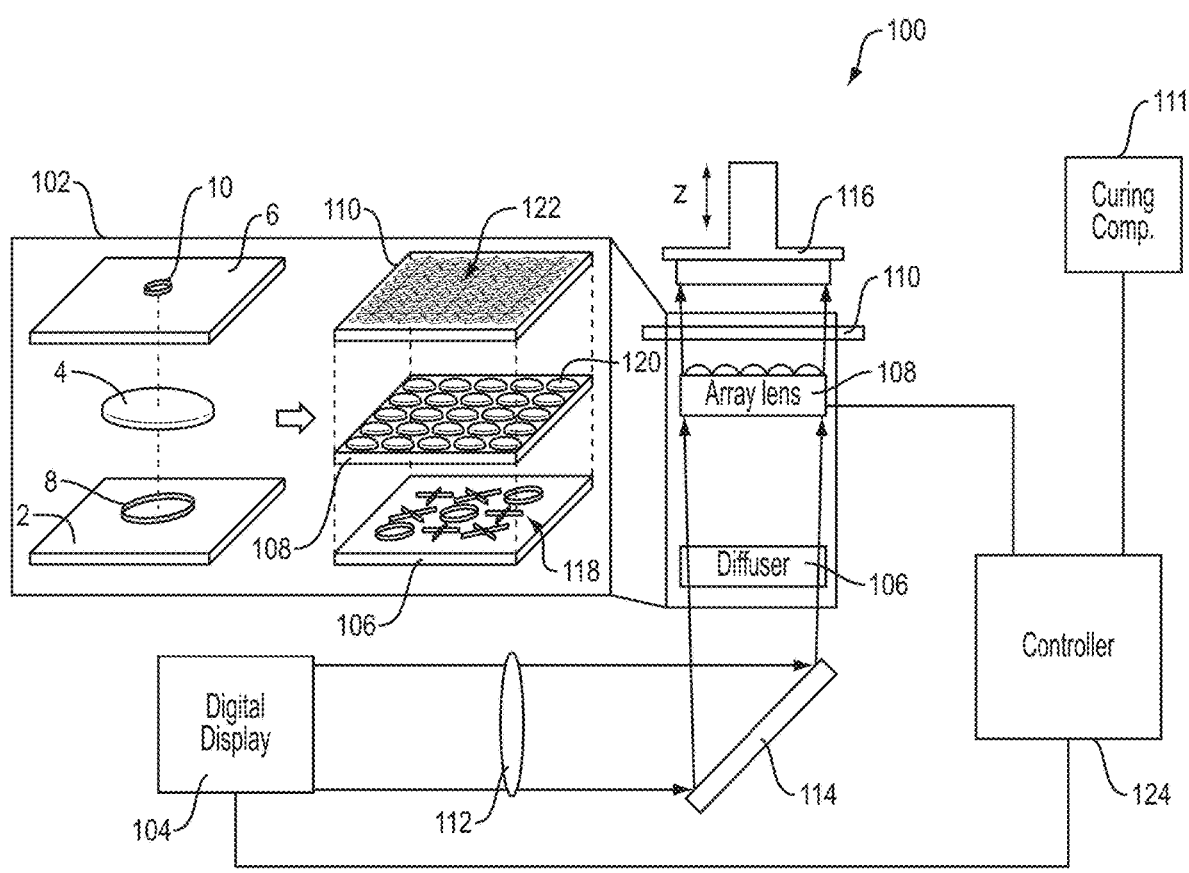
FIG. 1A is a schematic overview of one exemplary embodiment of a kaleidoscopic 3D printing system.

FIG. 1A presents a schematic overview of one exemplary embodiment of a kaleidoscopic 3D printing system 100. The kaleidoscopic 3D printing system 100 can include an image generator 104, an optical diffuser 106, an array-lens 108, and an output image chamber 110. The image generator 104 can digitally generate one or more object images and can project the object image(s) onto the optical diffuser 106. In some embodiments, one or more delivering optics 112 and/or one or more reflectors 114 can be used to project the object image(s) from the image generator 104 onto the optical diffuser 106. The reflector 114 can be placed between the image generator 104 and the optical diffuser 106 and can reflect one or more images from the image generator to the optical diffuser. By way of non-limiting example, the reflector 114 can be at least one of a mirror, a prism, or a phase array. In some instances, the reflector 114 can include a plurality of mirrors that can merge multiple reflections of the one or more object images onto the optical diffuser 106 such that an output image can be generated as a kaleidoscopic imaging pattern onto the output image chamber 110.

The optical diffuser 106 can act as an input image plane that can be observed by the array-lens 108. In this manner, illumination can be achieved in all directions. The array-lens 108 can be placed on or otherwise coupled to a micro-translation stage 116 to move the array-lens longitudinally in the z-axis (i.e., along a projection axis of the digital image from the optical diffuser 106 to the array-lens 108). Accordingly, the micro-translation stage 116 can be used to adjust a distance between the optical diffuser 106 (i.e., the input image plane) and the array-lens 108. In some embodiments, the kaleidoscopic 3D printing system 100 can be devoid of scanning optic modules.

As discussed in detail below, the array-lens 108 can replicate at least one image of the one or more images projected onto the optical diffuser 106 to create a plurality of output images. The array-lens 108 can then project the plurality of output images into the output image chamber 110 to produce a kaleidoscopic imaging pattern on a curable resin disposed in the output image chamber. The array-lens 108 can project a plurality of kaleidoscopic imaging patterns over time on the curable resin disposed in the output image chamber. A curing component 111 can cure the curable resin in the output image chamber 110 such that a three-dimensional printed object is printed from the curable resin based on the imaging pattern. In some embodiments, the curing component can cure the curable resin in a layer-by-layer manner to form the 3D printed object. The output chamber 110 can remain stationary while the 3D printed object is formed from the curable resin. By way of non-limiting example, the resulting 3D printed object can include a plurality of microfiber arrays, with the arrays having a diameter approximately in the range of about 1 micrometer to about 20 micrometers. A person skilled in the art, in view of the present disclosures, will recognize that other diameters are possible, including those smaller and larger than the range of about 1 micrometer to about 20 micrometers, such diameters being impacted, at least in part, by the sizes and shapes of the components of the system 100, the properties of the curable resin, and the desired 3D object to be printed. Further, the microfiber arrays can be based on a kaleidoscopic imaging pattern projected by the array-lens 108. In some embodiments, a surface area of the resulting 3D printed object onto which the plurality of microfiber arrays are disposed can be approximately in the range of about 625 mm$^2$ to about 2500 mm$^2$. Like the diameters, a person skilled in the art, in view of the present disclosures, will recognize that other surface areas are possible, including those smaller and larger than the range of about 625 mm$^2$ to about 2500 mm$^2$, such surface areas being impacted, at least in part, by the sizes and shapes of the components of the system 100, the properties of the curable resin, and the desired 3D object to be printed.

Inlay box 102 shows a general framework of integrated kaleidoscopic imaging patterns according to an embodiment of the present disclosure as compared to conventional projection-based SLA methods. More particularly, a conventional projection-based SLA system is illustrated in inlay 102 as having an input image plane 2, an optical lens 4, and an output image plane 6. An object image 8 is projected onto the input image plane 2, through the optical lens 4, and onto the output image plane 6 as an output image 10. As can be seen, the conventional optical lens 4 is a single lens unit that functions to replicate, and in this instance, focus to a smaller size the input image 8 onto the output image plane 6.

In contrast to the conventional projection-based SLA system, kaleidoscopic imaging in accordance with the kaleidoscopic 3D system 100 provides for multiple output images, each generated by a lens unit, forming kaleidoscopic patterns by some combination of image replication, superposition, and reconstruction through the array-lens 108. The one or more images generated by the image generator 104 can be projected onto the optical diffuser 106 as an input image 118. In some embodiments, as shown in FIG. 1A, the input image 118 can be an input image array that includes a plurality of images projected onto the optical diffuser 106. While the input image 118 is shown in FIG. 1 as an input array with three different base images (i.e., the object image array includes base image shapes of "X," "O," and "+") an input array can include any number of base image(s). Moreover, in some embodiments, the input image 118 can be a single image rather than an array.

The array-lens 108 can include a plurality of lens units 120. The array-lens 108 can receive the input image 118, replicate at least a portion of the input image 118 to create a plurality of output images, and project the plurality of output images onto the output image chamber 110. In some embodiments, the plurality of output images projected by the array-lens 108 can produce a kaleidoscopic imaging pattern 122 onto a curable resin disposed in the output image chamber 110. A curing component 111 can cure the curable resin in the output image chamber 110 such that a resulting three-dimensional printed object is printed based on the kaleidoscopic imaging pattern 122 projected onto the curable resin. The curing component 111 can include an illumination source having one or more energy beams that can be directed to the curable resin to cure the resin and form a three-dimensional object. Some non-limiting examples of incoherent illumination sources include LED, digital micromirror device (DMD), liquid crystal on silicon (LCoS), and microLED.

The kaleidoscopic 3D printing system 100 can also include a controller 124. In some embodiments, the controller 124 can be a digital controller that can operate at least one of the image generator 104 or the array-lens 108 such that the kaleidoscopic imagining pattern 122 is a digitally controlled kaleidoscopic imaging pattern. Additionally, or alternatively, the controller 124 can control the curing component to selectively cure parts of a volume of the curable resin disposed in the output image chamber 110 based on the kaleidoscopic imaging pattern 122. For example, in some embodiments the controller 124 can direct one or more light beams of the curing component to a specific point or along a specific path in the curable resin to selectively cure the resin.

The provided kaleidoscopic 3D printing system and associated printing processes can use one or more reconstructed kaleidoscopic images from one or more kaleidoscopic imaging patterns to print 3D architectures, for example by curing photopolymer resin onto which the kaleidoscopic imaging pattern is projected in a layer-by-layer fashion. Other ways of curing resin can also be utilized without departing from the spirit of the present disclosure. By way of non-limiting example, and as described in detail below, volumetric curing of resin is one alternative to layer-by-layer resin curing. Volumetric curing can enable 3D-printed parts to be cured in the order of seconds, rather than in minutes to hours.

Figure 1B:
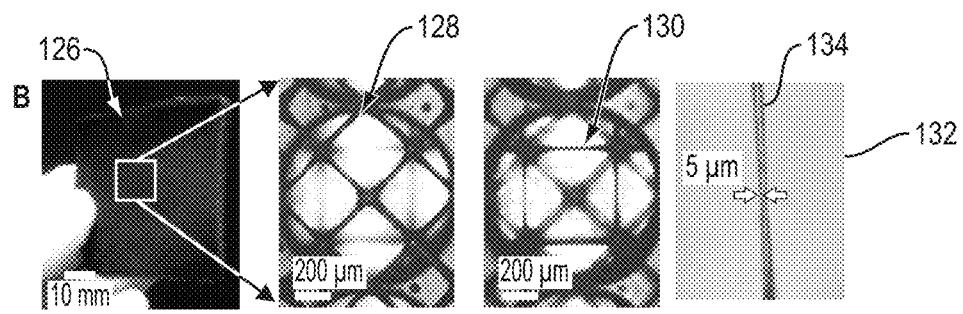
FIG. 1B is one exemplary embodiment of a microstructure formed by exemplary kaleidoscopic 3D printing systems and methods provided for herein, such as the system illustrated in FIG. 1A.
Figures 1C, 1D:
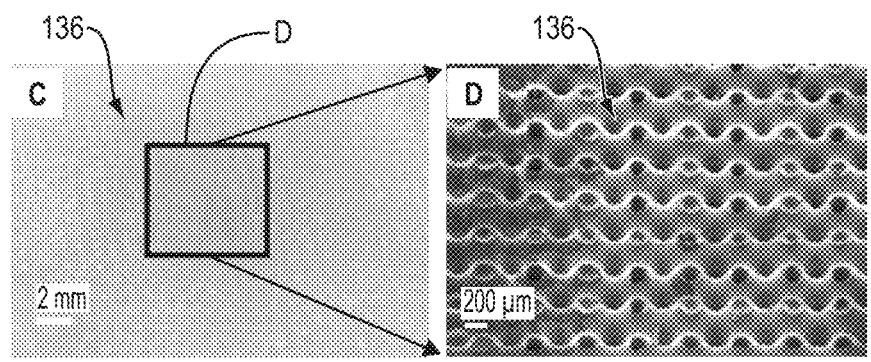
FIG. 1C is another exemplary embodiment of a microstructure formed by exemplary kaleidoscopic 3D printing systems and methods provided for herein, such as the system illustrated in FIG. 1A, the microstructure being a triple periodic bicontinuous microstructure.
FIG. 1D is a detailed view of the microstructure of FIG. 1C.

FIGS. 1B-1D illustrate exemplary embodiments of microstructures that can be printed with the systems and methods disclosed herein using kaleidoscopic imaging patterns generated by an array-lens. Each of the microstructures shown in FIGS. 1B-1D were fabricated layer-by-layer with an exposure time approximately in the range of about 3 seconds to about 20 seconds under an illumination power of approximately 33 mW/cm$^2$. Other exposure durations and illumination powers are possible without departing from the spirit of the present disclosure.

FIG. 1B shows a printed 3D object 126 of suspended fibrous lattices. The 3D object 126 can have an architecture of free-standing microfiber arrays, with each microfiber feature having a diameter approximately in a range of about 5 µm to about 20 µm (although, as noted above, other diameters sizes are possible). Detailed views of microfiber arrays of the 3D object 126 are shown in images 128 and 130. An overall size of a free-standing microfiber array can be approximately about 50 mm$^2$ by about 50 mm$^2$. As can be seen in image 132, a minimum feature 134 of the object 126 can be approximately 5 µm over an area several tens of centimeter. The 3D object 126 demonstrates the feasibility to print polymeric structures that break traditional scaling limits.

Figures 1E, 1F:
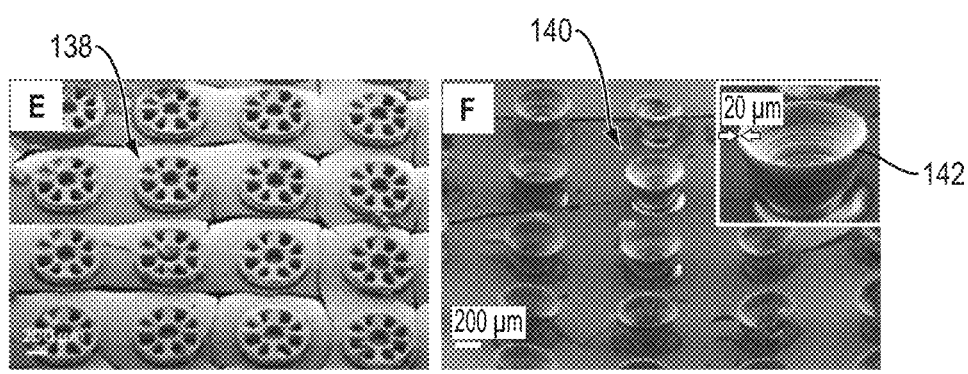
FIG. 1E is still another exemplary embodiment of a microstructure formed by exemplary kaleidoscopic 3D printing systems and methods provided for herein, such as the system illustrated in FIG. 1A, the microstructure being a circular-shaped microscaffold.
FIG. 1F is yet another exemplary embodiment of a microstructure formed by exemplary kaleidoscopic 3D printing systems and methods provided for herein, such as the system illustrated in FIG. 1A, the microstructure being a micro-cup array.

Connectivity of a microstructure printed in accordance with the methods, systems, and devices disclosed herein can be adjusted by controlling the kaleidoscopic imaging pattern 122 projected onto the curable resin in the output image chamber 110. By controlling the overlap of output images (i.e., the kaleidoscopic imaging pattern 122), printed microarchitectures with varied connectivity from interconnected triply periodic minimal surfaces (see, e.g. FIGS. 1C and 1D) to isolated circular-shaped scaffolds, or micro-cup array (see, e.g., FIGS. 1E and 1F), among other printed results, can be achieved. For example, FIGS. 1C and 1D show a triple periodic bicontinuous microstructure 136, with FIG. 1C being illustrated at 2 mm magnification and FIG. 1D being illustrated at 200 µm magnification. FIG. 1E shows a circular-shaped microscaffold 138, and FIG. 1F shows a micro-cup array 140, that latter including an array of micro-cup units 142. In some instances, the micro-cup unit 142 can have a thickness of approximately 20 µm, although other thicknesses are possible. Each of the objects shown in FIGS. 1C-1F were printed in accordance with the systems, devices, and methods disclosed herein.

Digitally Controlled Image-Based Versatile Kaleidoscopic Patterns

FIGS. 2A-2D illustrate exemplary embodiments of digitally controlled kaleidoscopic imaging patterns and show how interplay between an array-lens and input object image(s) can produce and control kaleidoscopic pattern outputs.

Figure 2A:
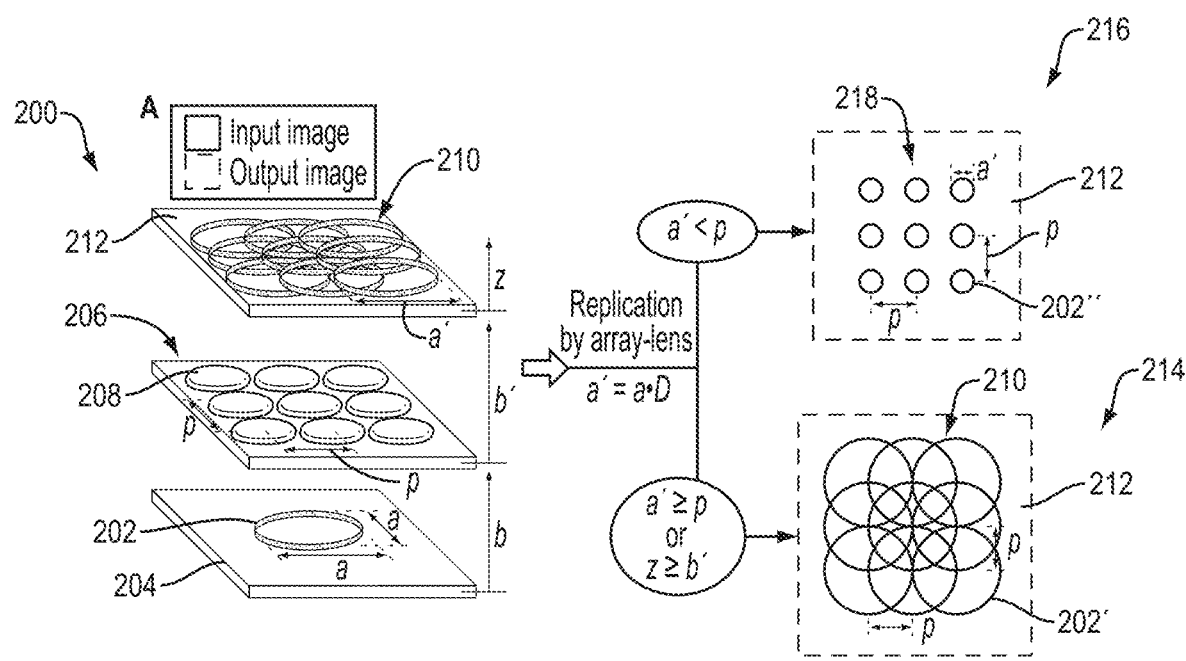
FIG. 2A is a schematic overview of one exemplary embodiment of an imaging framework for one exemplary embodiment of at least a portion of a projection-based 3D printer.

FIG. 2A shows an imaging framework 200 of one embodiment of a projection-based 3D printer. More particularly, the imaging framework 200 shows an object-to-array imaging projection. A single object input image 202 can be generated and projected by an image generator (not shown) onto an optical diffuser 204. The single object input image can be spatially captured by an array-lens 206, which can include a plurality of lens units 208. The array-lens 206 can generate an output imaging pattern 210, for example through replication of the input image, and project the output imaging pattern onto a curable resin disposed in an output image chamber 212. The curable resin can subsequently be cured in accordance with the output imaging pattern 210 projected thereon. In accordance with the present disclosures, the output imaging pattern 210 can include an array of repetitive patterns, which can produce complex kaleidoscopic patterns beyond simple replicated images. Other patterns are also possible, as provided for herein and understood by a person skilled in the art in view of the present disclosures.

Different from conventional kaleidoscopic imaging patterns based on diffraction and interference patterns of divided laser beams or the illumination of a monochromatic wave, the image-based kaleidoscopic patterns provided for in the present disclosure mainly stem from the overlapping and superposition of multiple output images of the array-lens, which enables periodical imaging patterns. This approach can also exploit more controllable and predictable patterns through combinations of the dynamic input object image(s) and array-lens imaging. There is a geometric relation between the array-lens, input image, and output image as schematically shown in FIG. 2A. A thin lens equation of $1/f=1/b+1/b'$ can be used to analyze an input object image size a, an output image size a', and connectivity of resulting output images. In the provided equation, f is an effective focal length of each lens-unit 208, b is an imaging distance between the array-lens 206 and the input image plane (i.e., the optical diffuser 204), and b' is an imaging distance from the array-lens 206 to the output image plane (i.e., the output image chamber 212), respectively. Further, a demagnification factor D of the output image by each unit lens is defined as $D=b'/b=f/(b-J)$, and the resulting output image size a' of each lens unit is a×D. In this instance, it is assumed that the unit lens size is equal to a lattice spacing p of the array-lens. The lattice spacing p can be measured as a distance between center points of adjacent lens units, as shown in FIG. 2A.

When the output image size a' is larger than or equal to the lattice spacing p of the array-lens, the multiplied images generated and projected by the array-lens 206, are connected and overlapped with each other to reproduce kaleidoscopic patterns in the same imaging plane. In other words, the output imaging pattern 210 can be a kaleidoscopic imaging pattern that can be generated and projected by the lens-array 206 through overlapping and superposition of multiple images replicated by the lens-array from the single object input image 202. As shown in a top-down view 214 of the output image chamber 212, the output image 210 can be a kaleidoscopic imaging pattern of multiple generated images 202' reproduced by the array-lens 206 and projected onto the curable resin disposed in the output image chamber 212. In instances in which the output image size a' is smaller than the lattice spacing p of the array-lens, the array-lens can generate and project an output image as a simple array (e.g., without image overlap and/or kaleidoscopic pattern). By way of example, another embodiment of an output image 218 can be seen in top-down view 216 of the output image chamber 212. The output image 218 can be an array of multiple generated images 202", which can be generated and projected onto resin disposed in the output image chamber 212 by the array-lens 206. Thus, the output images can be manipulated to simple replicated patterns (a'/p<1) or versatile interwoven patterns (a'/p≥1) in cooperation with digitally controlled input images.

Figure 2B:
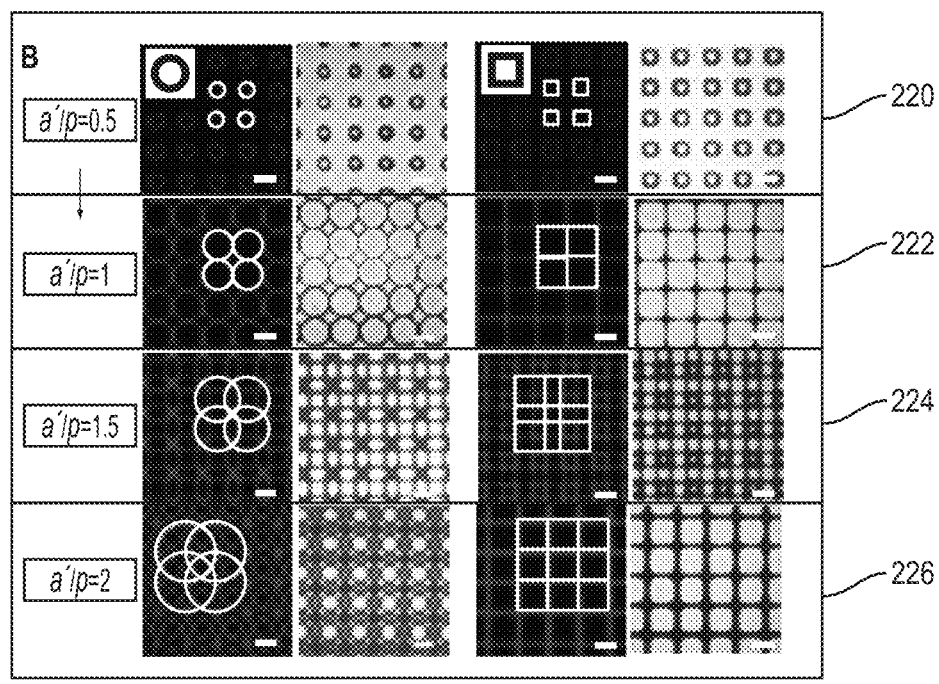
FIG. 2B illustrates various exemplary embodiments of kaleidoscopic output images used and/or generated in conjunction with the systems and methods provided for herein.

FIG. 2B shows various exemplary embodiments of kaleidoscopic output images and printed structures in accordance with the present disclosure. More particularly, FIG. 2B shows representative output patterns that an array-lens can generate and project onto curable resin after modifications to the shape and size of the input object. As discussed above, for an image framework in which a ratio of the output image size to the lattice spacing of lens units in the array-lens is less than one (a'/p<1), the array-lens can replicate and project an output pattern of multiple isolated images onto an imaging plane (i.e., onto the output image chamber). FIG. 2B illustrates this condition in box 220 for a circular input image and for a square input image. On the other hand, instances in which a ratio of the output image size to the lattice spacing of the lens units in the array-lens is greater than or equal to one (a'/p≥1), the array-lens can replicate and project an output pattern of multiplied images integrated to reconstruct and form a kaleidoscopic output imaging pattern. Boxes 222, 224, and 226 show certain exemplary embodiments of kaleidoscopic imaging that can be successfully printed with the systems and methods disclosed herein. More particularly, each box 222, 224, and 226 shows a kaleidoscopic output imaging pattern generated with varying ratio of the output image size to the lens unit lattice spacing. FIG. 2B illustrates how connectivity and overlap of the output image can be affected by this particular ratio, and verifies the optical field distribution of some different kaleidoscope imaging that can be successfully printed into the corresponding patterns. Moreover, the present printing systems and methods can realize more diverse patterns at different imaging planes. By changing the distance from the imaging plane to the array-lens, the periodic output images can be reproduced due to the superposition of multiple images with the same or scaled up periods at a certain location. This enables the out-of-plane kaleidoscopic patterns with periodic optical distribution at different propagation distance along a z-axis (z≥b').

Figure 2C:
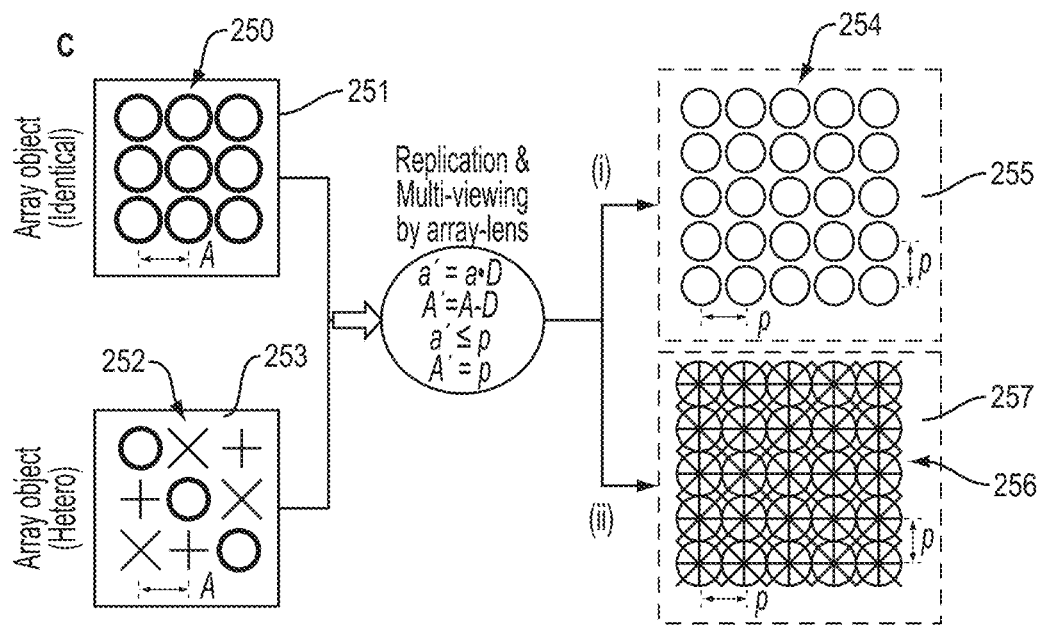
FIG. 2C is a schematic overview of one exemplary embodiment of array-to-array kaleidoscopic imaging used and/or generated in conjunction with the systems and methods provided for herein.
Figure 2D:
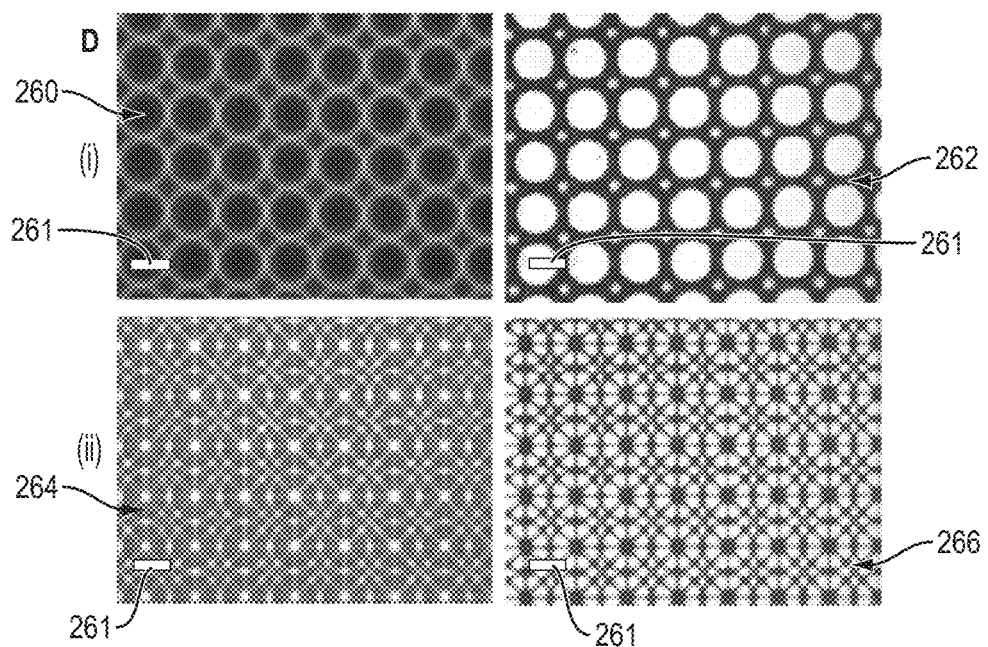
FIG. 2D illustrates various exemplary resulting kaleidoscopic images and patterns resulting from a multiple-image object image array, such as the array of FIG. 2C, in conjunction with the systems and methods provided for herein.

FIGS. 2C and 2D illustrate exemplary embodiments of array-to-array kaleidoscopic imaging in accordance with the present disclosure. A kaleidoscopic output imaging pattern can be desirable for more scalable printing. FIG. 2C shows an exemplary embodiment of array-to-array imaging that outputs a kaleidoscopic imaging pattern onto a curable resin. In the array-to-array imaging of FIG. 2C, an image generator (not shown) can generate a periodic object array, two options shown as arrays 250 and 252 (the options can be used together or separately), as an input image and can project the input image onto an optical diffuser, shown as diffusers 251 and 253, respectively. A lens-array (not shown) can receive the periodic object array input image and generate and project a kaleidoscopic imaging pattern, shown as patterns 254 and 256, onto curable resin disposed in an output image chamber, shown as chambers 255 and 257. Accordingly, both the input image and the output image can be in the form of an image array. This array-to-array imaging of FIG. 2C is in contrast to "one-to-array" imaging, discussed above with respect to FIGS. 2A and 2B, in which an input image is a single object image. The periodic object array can be an identical periodic object array 250, in which a single base image is repeated in an array pattern, or a hetero periodic object image array 252, in which a plurality of base images are repeated in an array pattern. By way of non-limiting example, the hetero periodic object array can include three distinct base images, "O," "X," and "+." Other numbers of patterns can also be used, including two and more than three.

Because of the field of view of the array-lens, the images from other objects (not orthogonally projected) can be also focused at their own imaging region, thus multiple objects can be converged at the same point to generate reconstructed output images. This composite image is based on periodically repeated and superimposed object array patterns imaged by the array-lens, and the imaging capacity of the array-lens allows kaleidoscopic patterns for scalable printing. The spacing A of input images 250, 252 is reduced by a factor of D and formed the spacing A' of the output images. The spacing A of the input images 250, 252 can be measured as a distance between the center of two adjacent objects in the periodic array. The spacing A' of the output images can be measured as a distance between the center of two adjacent objects in the generated output image arrays 254, 256. When A' is equal to or substantially equal to the lattice spacing of the array-lens p, as shown in FIG. 2C, it can lead to create a coincident superposition and a continuous networked pattern of all output images of the array-lens. Thus, the proposed condition can be described as A'=p and a'≤p to enable a desired image construction by the superimposed images. In other words, when the output image spacing A' is equal or substantially equal to the lattice spacing p of lens units in the array-lens and the output image size a' is less than or substantially equal to the lattice spacing of lens units in the array-lens p, multiplied images generated and projected by the array-lens can be integrated to reconstruct a kaleidoscopic image such that the array-lens outputs a kaleidoscopic imaging pattern (254, 256).

The reconstructed images can be projected by the array-lens as an output imaging pattern onto an imaging plane of array-lens (e.g., an output image chamber having, for example, a photocurable curable resin disposed therein), captured by an optical microscope, and then recorded within the photopolymer resin. For example, a homogeneous light distribution into the array-lens 108 from the optical diffuser 106 can enable images from different perspectives (i.e., not orthogonally projected) to be combined in the reconstruction process. In contrast to generated patterns based on a parallel transfer and superposition of a single input image, as shown, for example, in FIGS. 2A and 2B, each lens unit of an array-lens can observe multiple elemental images and reconstruct the images into identical and/or highly periodic composited patterns, such as those shown in FIG. 2D. FIG. 2D shows several exemplary resulting kaleidoscopic images and patterns 260, 262, 264, 266 of a multiple-image object image array (i.e., an output image array) that can be generated by multiple copying and multi-viewing of an input image array by the array-lens. For example, the kaleidoscopic imaging allows for the production of highly periodic patterns 260, 262 in a case of the identical array object 'o' in FIG. 2D(i), or a reconfiguration of the heterogeneous array objects 'o', '+', and 'x' to the identical, periodic patterns 264, 266 in FIG. 2D(ii). A bar 261 is present in each image of the patterns 260, 262, 264, 266 for scale. The bar 261 in each image is approximately 100 μm.

Illumination Distribution

Figures 3A, 3B, 3C:
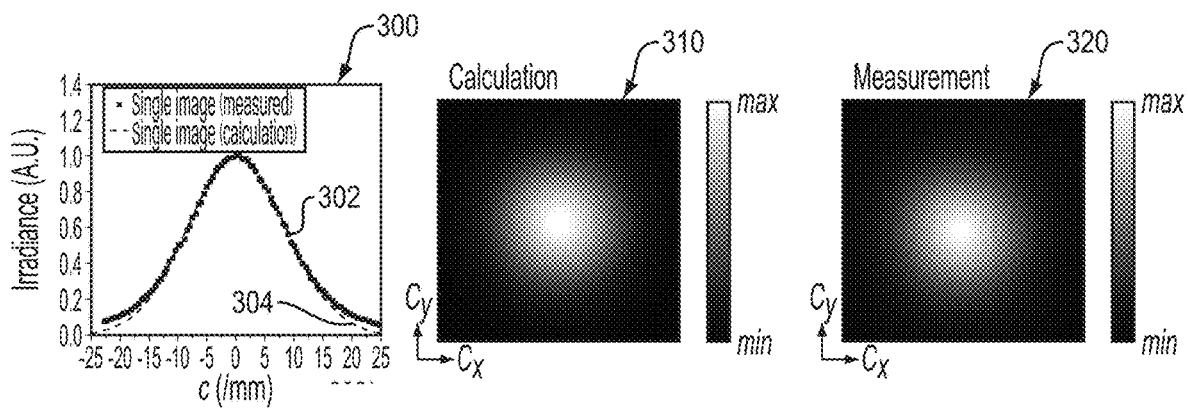
FIG. 3A is one exemplary embodiment of a calculated irradiance distribution compared to a measured irradiance distribution resulting from the systems and methods provided for herein.
FIG. 3B illustrates a 2D irradiance distribution for a single image source based on the calculated irradiance distribution of FIG. 3A.
FIG. 3C illustrates a 2D irradiance distribution for a single image source based on the measured irradiance distribution of FIG. 3A.

FIG. 3A provides for an irradiance distribution 300 (normalized to its maximum value) along a horizontal direction G direction at the center of vertical direction $C_y$ for an input image size a=9 mm and an imaging distance between an array-lens and optical diffuser b=68.75 mm. The dotted curve 302 and dashed curve 304 show the measured and calculated irradiance patterns of a single image source, respectively. FIG. 3B illustrates a two-dimensional (2D) irradiance distribution 310 for a single image source based on the calculated irradiance, and FIG. 3C illustrates a 2D-irradiance distribution 320 for a single image source based on the measured irradiance. As can be seen, the measured 2D-irradiance distribution 320 closely resembles the expected 2D-irradiance distribution 310 based on the calculated irradiance.

Figures 3D, 3E, 3F:
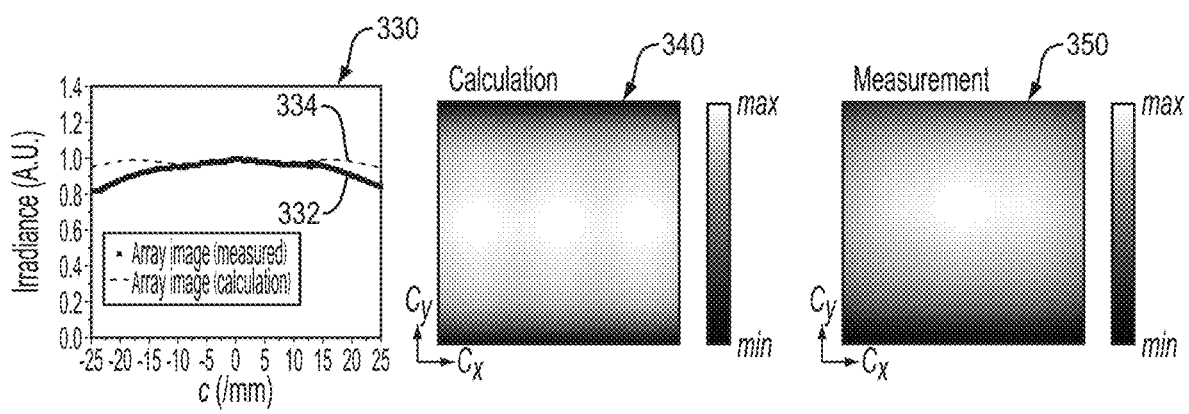
FIG. 3D is one exemplary embodiment a calculated irradiance distribution compared to a measured irradiance distribution for a square array of circular sources resulting from the systems and methods provided for herein.
FIG. 3E illustrates a 2D irradiance distribution for a single image source based on the calculated irradiance distribution of FIG. 3D.
FIG. 3F illustrates a 2D irradiance distribution for a single image source based on the measured irradiance distribution of FIG. 3D.

FIG. 3D provides for an irradiance distribution 330 for a square array of 5×3 circular sources with an input image size a=9 mm and a spacing of input images A=10 mm. FIG. 3E illustrates a 2D irradiance distribution for a single image source based on the calculated irradiance, and FIG. 3F illustrates a 2D irradiance distribution for a single image source based on the measured irradiance.

The illumination distribution over the array-lens area factors into achieving desired photopolymerization. A digital microdisplay device 104 can provide dynamic images onto the optical diffuser 106, which can work as a virtual and reconfigurable photomask. The diffuser can scatter the light to produce a near Lambertian profiles, ensuring homogeneous illumination at the array-lens 108. In such a setup, scattered light enters the array-lens 108 positioned at an imaging distance of b, where each lens refocuses the light to create a reduced image of the images generated by the optical diffuser 106. Thus, as provided for herein, the illumination distribution incident to the array-lens 108 with various object image configurations can be investigated. For simplicity, a circular shape is used as the virtual input image and it is assumed that the optical diffuser was an imperfect Lambertian emitter. This simplified process can further enable an adapted form of radiometric analysis and a comparison between the illumination distribution of a single object and array objects.

Approximated equations of illumination distributions for both a single object and array objects described by the radiometric analysis with Cartesian coordinates can be derived. As illustrated by FIG. 3A, the single object can produce the radiant power distribution as cosine-power function of $\cos^m(\theta)$, where $\theta$ is a radiating angle and m represents a directionality of the radiant power from the image source. As shown in FIGS. 3B and 3C, the illumination distribution 310, 320 of the single circular source with about 9 mm diameter exhibits a narrow flat region, thereby limiting the scalability of the kaleidoscopic printing. The illumination homogeneity can be significantly improved by superimposing array objects sources, which can create a large region of uniform illuminance compared to the smaller uniform region illuminated by a single object, such as the illumination distributions shown in FIGS. 3B and 3C.

For example, the sum of illumination distributions for a square array of 5×3 circular sources are depicted in FIGS. 3D-3F. The illumination distribution 330 of FIG. 3D shows uniform illumination along the horizontal direction at an imaging distance of b from the diffuser. A dotted line 332 and a dashed line 334 show a measured and a calculated irradiance pattern of the square array of 5×3 circular sources, respectively. FIG. 3E shows a calculated illumination distribution 340 of the square array of 5×3 circular sources, while FIG. 3F shows a measured illumination distribution 350 of the square array of 5×3 circular sources. The discrepancy of the calculation and measurement at the edges may originate from the small divergence angle φ caused by the delivering optics in a pristine system. As a result, this illumination superposition scheme generates large scale uniform illumination.

Scalable Photopolymerization

Figure 4A:
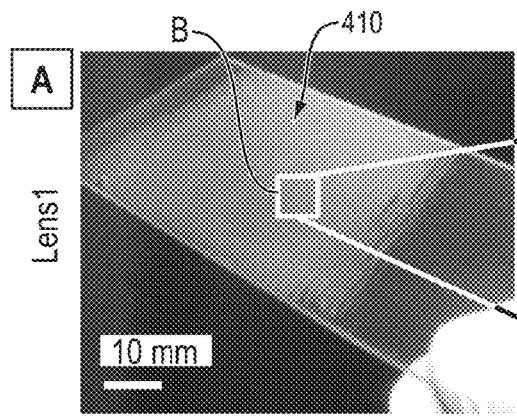
FIG. 4A is one exemplary embodiment of a 3D-printed object printed in accordance with the systems and methods provided for herein.
Figure 4B:
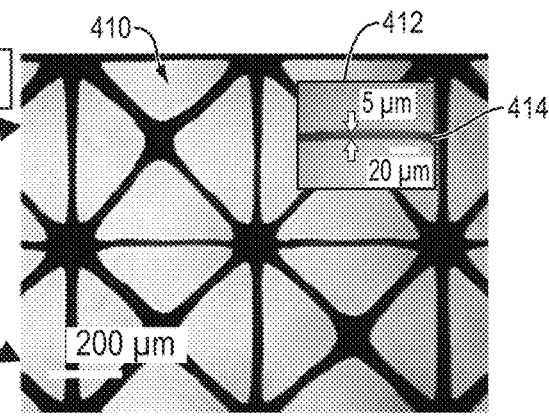
FIG. 4B is a detailed, enlarged view of periodic microstructures of fibrous lattices of the object of FIG. 4A.
Figure 4C:
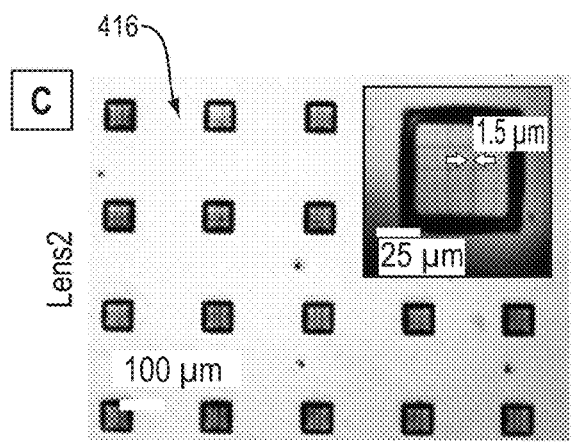
FIG. 4C is one exemplary embodiment of a 3D microfabrication structure printed in accordance with the systems and methods provided for herein.
Figure 4D:
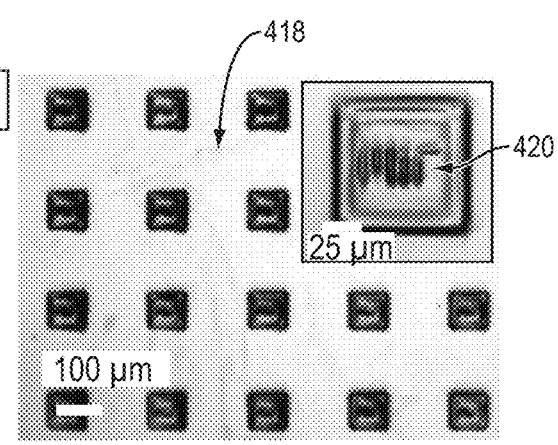
FIG. 4D is another exemplary embodiment of a 3D microfabrication structure printed in accordance with the systems and methods provided for herein.

The present disclosure provides for scalable microprinting by leveraging a digitally controlled kaleidoscopic pattern and illumination superposition scheme. FIGS. 4A-4D show exemplary embodiments of scalable printing with small feature sizes and geometric control in accordance with the present disclosure. In some tested embodiments, periodic microstructures of fibrous lattice were printed under Lens 1 (an array-lens with a f=5.5 mm, p=1 mm, effective NA 0.09, and overall size of 50×50 mm$^2$) with a minimum feature size of approximately 5 μm over an exposure area up to approximately 2500 mm$^2$. FIG. 4A shows an image of an exemplary 3D printed object 410 printed under Lens1. FIG. 4B is a detailed, enlarged view of the periodic microstructures of fibrous lattices of the object 410. Inlay box 412 shows an enlarged view of a portion 414 of the fibrous lattice of object 410, and illustrates a minimum feature size of the fibrous lattice to be about 5 μm. FIG. 4C shows an image of an exemplary 3D microfabrication structure 416 having arbitrary patterns from array lines with a minimum feature size of approximately 1.5 μm. FIG. 4D shows an image of yet another exemplary microfabrication with minimum feature sizes approximately in the range of about 1 μm to about 2 μm and an array letter combination of 'MiT' 420 with approximately 50 μm length. The microfabrication structures 416, 418 being fabricated by using Lens2 (an array-lens having f=0.57 mm, p=0.25 mm, effective NA 0.22, and overall size 25×25 mm$^2$) with a maximum exposure area up to approximately 625 mm$^2$. Each of the microstructures shown in FIGS. 4A-4D can be printed with a single exposure approximately in the range of about 3 seconds to about 10 seconds under illumination power of approximately 33 mW/cm$^2$. Considering a several mm$^2$ exposure area from a single-lens imaging-based SLA with a similar lateral feature size, the areal ratio (approximately 102) of printing scales supports that this approach enables scalable printing without compromising optical resolution.

In conventional single-lens imaging-based SLA, printing small feature sizes are incompatible with a large build area according to the traditional scaling law. Behind this scaling argument is a discretized pixel-based technology in digital microdisplay devices. Since an areal build size ($A_S$) in mm$^2$ during one exposure is equal to the pixel throughput of the imaging system, the total fabrication time of projection-based SLA scales to $$\left(\frac{xy\text{-dimension}}{A_S}\right) \cdot \left(\frac{z\text{-dimension}}{\text{layer thickness}}\right),$$

where $A_S$ is defined as $$(\text{total pixels}) \cdot \left(\frac{\text{pixel size of digital mask}}{\text{magnification of projection lens}}\right)^2.$$

A conventional strategy for improving resolution of the build is to increase the magnification of the projection lens to reduce the projected pixel size. For example, reducing the projected pixel size by an increase in the magnification of the projection lens by a factor of 10 results in the decrease of the areal build size $A_S$ by a factor of 100 and leads to a significant increase in fabrication time. Thus, the scaling problem of increasing the areal build size $A_S$ without compromising the resolution remains a challenge in projection-based SLA. To investigate the effect of kaleidoscopic printing on the scaling issue, an analysis on areal build size $A_S$ and minimum feature size (R) in μm for a range of existing projection-based SLA products with available digital microdisplay devices can be performed.

Figure 5:
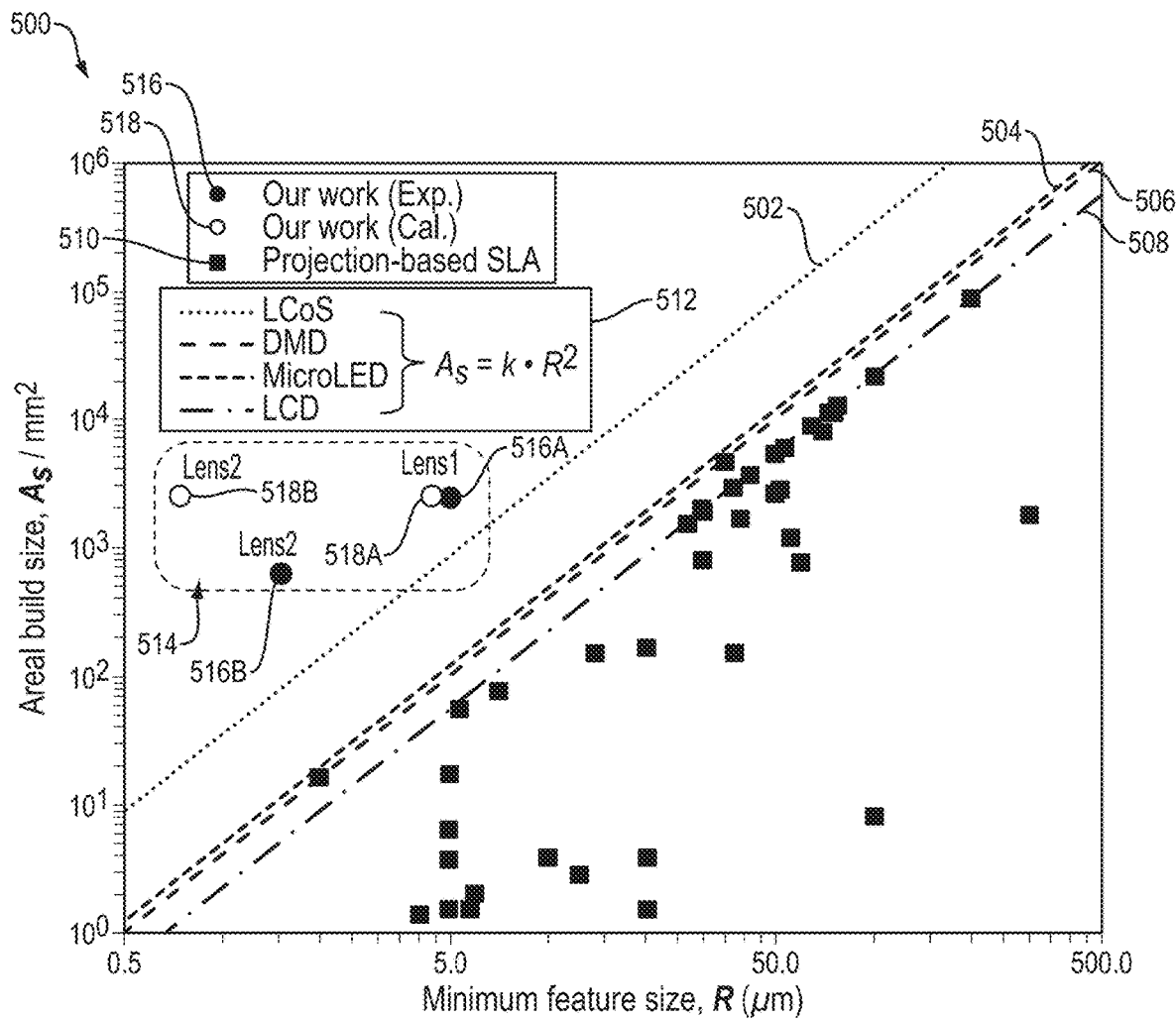
FIG. 5 is a graph illustrating an areal build size as a function of an achievable minimum feature size to illustrate the derivation of an analytical scaling equation.

FIG. 5 shows a plot 500 of areal build size (As) as a function of the achievable minimum feature size (R). The plot 500 includes four plotted lines—502, 504, 506, 508—each representing an analytical scaling equation As=k*r2 of a conventional projection-based SLA method using a different microdisplay devices. Derivation of the analytical scaling equation, along with the four plotted lines, is discussed in further detail, below.

On the As-R plot 500, the minimum feature size R is rendered as $$\left(\frac{\text{pixel size of digital mask}}{\text{magnification of projection } lens}\right).$$

A data table used to produce this plot is as follows, identified herein as Table 1:

TABLE 1

| Reference | Type of Digital mask | Display area (mm2) | Projection/focusing optics | Minimum feature size (um) | Maximum Projection Area/exposure (mm2) | Printing Methods |
|---|---|---|---|---|---|---|
| 1 | DMD 1280 × 1024 pitch size 14~17 um | 17.9 × 14.3 21.76 × 17.4 | 5:1 reduction lens | Theo. 1.1 Exp. 3.4 | 3.58 × 2.86 4.3 × 3.5 | top-down |
| 2 | DMD 1024 × 768 pixel 13.68 um | 14 × 10.5 | N/A | Exp. 50 | N/A | top-down |
| 3 | LCD pixel pitch 26 × 24 um² | N/A | N/A | Theo. 2 Exp. 20 | 15 mm × 11 mm | top-down |
| 4 | DMD 1024 × 768 pixel 13.68 um | 14 × 10.5 | NA 0.3 NA 0.13 | The. 2.4, 5.9 Exp. 10-30 | 1.95 mm × 1.95 mm | top-down |
| 5 | DMD 1024 × 768 pixel 13.68 um | 14 × 10.5 | 10:1 reduction lens | Exp. 5 | 1.4 × 1.05 | top-down |
| 6-a, b, c | LCo5 1920 × 1080 pixel 8 um | 15.36 × 8.54 | 6:1 reduction lens | The. 1.3 Exp. 10 | 2.56 × 1.44 | top-down |
| 7 | DMD 1024 × 768 pixel 13.68 um | 14 × 10.5 | 1:1 lens | Exp. 25-50 | 14.6 × 10.9 mm | bottom-up |
| 8 | DMD 1024 × 768 pixel 13.68 um | 14 × 10.5 | 5:1 reduction lens | Theo. 2-2.5 Exp. 5 (FWHM 2.5) | 2.8 × 2.1 | Maskless Projection Lithography, protein adsorption by photobleaching |
| 9 | DMD 1024 × 768 | N/A | Built in lens of projector (CASIO XI-S36) | 300 | 48 × 36 mm | multi-material bottom-up |
| 10 | DMD 1920 × 1080 pixel 10.8 um | N/A | 2:1 reduction lens | Theo. 5.4 Exp. N/A | 6 × 8 mm | top-down |
| 11-a, b, c | DMD 1920 × 1080 | N/A | N/A | Exp. 5 | 4.6 × 3.5 | top-down |
| 12 | DMD 1024 × 768 13.6 | 14 × 10.5 | 1:1 projection lens | Theo. 14 | 14 × 10.5 | Maskless Projection Lithography |
| 13 | DMD 1920 × 1080 pixel 5 um | 9.6 × 5.4 | 4:1 projection lens | 200 | 384 × 216 | |
| 14 | DMD 1024 × 768 pixel 10.8 um | 11 × 8.3 | 5:1 reduction lens | 5 | 2.52 × 1.41 | top-down |
| 15 | LCo5 1920 × 1080 | | 7:1 reduction lens | Theo. 1.2 Exp. 10-15 | 1.2 × 2.2 mm | top-down |
| 16 | DLP 1920 × 1080 | 20 | N/A | 100 75 50 | 190 × 110 142 × 78.7 94 × 53.3 | bottom-up |
| 17 | DLP 1920 × 1080 | N/A | N/A | vida 73 vida HD 50 Vida HD Crown & Bridge 35 | vida 140 × 79 vida HD 95 × 54 Vida HD Crown & Bridge 90 × 50 | bottom-up |
| 18 | DLP | N/A | N/A | DB9 creator 70 B9 core 530 30 B9 core 550 50 | DB9 creator 102 × 78 B9 core 530 57.6 × 32.4 B9 core 550 96 × 54 | bottom-up |
| 19 | DLP | N/A | N/A | PICO 2-39 39 PICO 2-50 50 PICO 2 HD27 27 PICO 2 HD37 37 | PICO 2-39 51 × 32 PICO 2-50 64 × 40 PICO 2 HD27 51.8 × 29 PICO 2 HD37 71 × 40 | bottom-up |
| 20-a, b, c | DLP | 10.3 × 7.7 | N/A | M1.75 Exp. 50 | 141 × 79 mm | Continuous bottom-up |
| 21 | DMD TM500 912 × 1140 pixel 7.6 um | 0.45* | ~7:1 projection lens | 50 | 64 × 40 mm | bottom-up |
| 22 | DMD 1024 × 768 pixel 13.6 um | 14 × 10.5 | 10:1 reduction lens | Theo. 1.36 Exp. 20 | 1.4 × 1.05 | Projection Printing |
| 23 | Asiga Pico Plus 27 DMD TM500 912 × 1140 | 0.45* | N/A | Theo. 27 (1 pixel) Exp. 60 (2 pixel) | 35 * 21.8 | bottom-up |

TABLE 1-continued

| Reference | Type of Digital mask | Display area (mm2) | Projection/focusing optics | Minimum feature size (um) | Maximum Projection Area/exposure (mm2) | Printing Methods |
|---|---|---|---|---|---|---|
| 24 | DMD 608 × 684 pixel 7.6 um | 0.3* | 1:1 projection lens | Exp. 100 | 4 × 2 | top-down |
| 25 | DMD pixel 7.6 um | N/A | 7:1 reduction lens | Theo. 2 Exp. 6 | 1.1 × 1.8 | top-down |
| 26 | DMD pixel 13.65 um | N/A | 10× NA 0.30 | Exp. 2.5 | 0.4 × 0.4 | Projection Printing |
| 27 | Epson PowerLite 55 LCD projector LCD 800 × 600 pixel ~17 um | 13.8 × 10 | 10× NA 0.30 | Exp. 3-5 | 1.36 × 1 | bottom-up |
| 28-a, b | LCo5 1400 × 1050 pixel 10.65 um | N/A | 1.5:1 reduction lens | Theo. 7.1 | 10 × 7.5 mm2 | top-down |
| 29 | Optoma HD20 HD DLP 1920 × 1080 DLP 1280 × 800 | N/A | N/A | Optoma HD20 HD DLP 29.5 × 32.7 DLP4500 51.2 × 51.2 | Optoma HD20 HD DLP 56.7 mm × 35.4 mm DLP4500 85.6 mm × 41 mm | bottom-up |
| 30 | DLP 1024 × 768 pixel 10.8 um | N/A | 1:3 projection lens | 30 μm × 30 μm | 32 × 24 | |
| 31 | DLP 1024 × 768 pixel 13.7 um | 18 × 10.5 mm2 | 10:1 reduction lens | Theo. 1.37 Exp. 5.8 | 1.4 × 1.05 | Grayscale gel lithography |
| 32-a, b | DLP | N/A | N/A | Miicraft+ 56 * 56 MiiCraft 50 30 MiiCraft 80 41.5 MiiCraft 150 53 MiiCraft 125 65 MiiCraft 150 78 | Miicraft+ 48 * 27 MiiCraft 50 57 × 32 MiiCraft 80 80 × 45 MiiCraft 150 102 × 57.5 MiiCraft 125 125 × 70 MiiCraft 150 150 × 84.4 | bottom-up |

An empirical scaling behavior is deduced from the specific published results of projection-based SLA, provided in Table 1. The specific published results of projection-based SLA are plotted as gray squares 510 in FIG. 5 and presented in Table 1. Following the apparent scaling dependence of the projection-based SLA, a theoretical analysis can predict the relationship $A_S = k \cdot R^2$, where k is a scaling constant corresponding to the total pixels of available digital microdisplay devices, whether on liquid crystal on silicon (LCoS), a digital micromirror device (DMD), a MicroLED, or a liquid crystal display (LCD), among other digital microdisplay device options. These analytic scaling boundaries are illustrated by dashed lines 502, 504, 506, 508 for several exemplary microdisplay device options. More particularly, and as shown in a key 512 to the plot 500, line 502 represents an LCoS display, line 506 represents a DMD display, line 504 represents a MicroLED display, and line 508 represents an LCD display.

A dashed oval 514 on the plot 500 contains experimental results 516 of kaleidoscopic printing provided for herein and calculated potentially ideal results 518 considering the potential of kaleidoscopic printing provided for herein. More particularly, experimental and calculated areal build size using Lens 1, as defined above, are provided at data point 516A and data point 518A, respectively. Similarly, data point 516B and 518B respectively represent the calculated and experimental areal build size using Lens2. As can be seen from the data points plotted within the oval 514, the areal build size of kaleidoscopic printing $A_K$ exhibits a different tendency from the $A_S$-R scaling of other projection-based SLA methods traded off against resolution and minimum feature size.

Based on the empirical evidence for the illumination distribution in the system provided for herein, the areal build size of kaleidoscopic printing AK can be described as less than or equal to the areal build size of other projection-based SLA methods. In other words, the allowable condition can be described as $A_K \leq A_S$ because the uniform illumination region and its resulting areal build size $A_S$ are determined by the maximum area of the virtual imaging mask to be observed by the array-lens. Considering this condition, the areal build size to minimum feature size relationship for kaleidoscopic printing (i.e., the $A_K$–R relationship) can be estimated to compare kaleidoscopic printing performance with that of current projection-based SLA analyzed in FIG. 5. Assuming that an effective planar resolution $R_{eff}$ of an array-lens is described as R×D by considering the geometrical optics, the resulting equation can be expressed by:

$$A_K \leq A_S = k \cdot R^2 = k \cdot \left(\frac{R_{eff}}{D}\right)^2 = \left(\frac{k}{D^2}\right) \cdot R_{eff}^2 k_{eff} \cdot R_{eff}^2,$$

where $k_{eff}$ is $k/D^2$ and $R_{eff}$ needs to be compliant with Abbe diffraction-limited spot size $d = \lambda/(2NA)$. Here, NA is the array-lens's unit lens numerical aperture.

In conjunction with the present disclosure, all printing experiments were performed at the imaging distance b of approximately 68.75 mm, the demagnification factor D of Lens1 (f=5.5 mm, p=1 mm, effective NA 0.09) and Lens2 (f=0.57 mm, p=0.25 mm, effective NA 0.22) are 0.087 and 0.0084, respectively, by considering the geometrical condition of the array-lens. The ideal $k_{eff}$ is calculated to $1.35 \times 10^8$ and $3.10 \times 10^9$ for Lens1 and Lens2, respectively (see details in the method section). From printed results in conjunction with the present disclosure, the experimental $k_{eff}$ of $1 \times 10^8$ and $2.77 \times 10^8$ for Lens1 and Lens2, respectively, were obtained. As illustrated by the data points within oval 514 falling above and to the left of the lines 502, 504, 506, 508 representing theoretical scaling of other projection-based SLA methods on plot 500 in FIG. 5, the SLA approach presented herein demonstrated the potential to break through the conventional scaling behavior of $A_S$-R. However, it may be that the discrepancy of $k_{eff}$ between calculated and experimental results does not imply the fundamental limit of the presently provided system performance. This is because the limit of $A_K$ depends, at least in part, on the available size of the array-lens and digital microdisplay devices, and the obtainable minimum feature size $R_{\it eff}$ is determined by an overall contribution from the photopolymerization kinetics, as well as by the resolution of the imaging system Additional Information Regarding Kaleidoscopic Printing The present disclosure demonstrates that kaleidoscopic printing can provide the scalable 3D printing of periodical microstructures. Periodic microstructures have drawn enormous attention owing to their broad applications in the field of biological scaffolds, mechanical metamaterials, functional surfaces, and chemical reactors for energy/environmental system. For instance, polymeric fiber lattice microstructures (e.g., as shown in FIG. 1B and FIGS. 4A and 4B) provide a more proper mechanical environment to mimic biological axons or capture circulating cells. By way of further example, 3D periodic microstructures, such as those represented in FIG. 1C, can provide topological benefits for use as tissue scaffolds, mechanical metamaterials, catalytic reactors, and feed spacers. In summary, the provided for systems and methods allow for the design and implementation of a kaleidoscopic printing system for scalable 3D microfabrication. The combination of the array-lens imaging and projection-based stereolithography system allows a user to digitally control image-based kaleidoscopic patterns for periodical, scalable, and high-resolution printing of 3D microstructures. This approach expands the capabilities of the large-area fabrication of complex and periodic microstructures.

Provided below is information related to materials, methods, and the like that can be used to demonstrate the capabilities of the present disclosure.

Materials and Methods

Imaging: The kaleidoscopic images generated by the array-lens can be recorded by using a microscope digital camera (e.g., AmScope MU500) with a 2× reduction lens. For imaging, an array-lens of a pitch 150 µm and f=5.2 mm (e.g., Thorlabs, MLA150-5C, overall size approximately 10×10 mm$^2$) can be placed at the imaging distance b=approximately 68.75 mm from the masking plane in the provided system. The projection image shapes and sizes can be adjusted, for instance from about 0.9 mm to about 3.6 mm, by considering the demagnification factor of 0.082 to observe kaleidoscopic images, as shown in FIG. 2. At this time, the focal plane of the microscope digital camera can coincide with the imaging plane of the array-lens (z=b'). A vertical set position of the digital microscope camera can be changed until out-of-plane kaleidoscopic patterns from the array-lens are observed. The distance between the focal plane of the microscope and the imaging plane of the array-lens can be gradually increased, and images can be captured according to the varying distance (z≥b'). 9×9 image arrays having identical or heterogeneous images on an imaging plane with a distance A of approximately 1.83 mm, can be organized and images when z=b' can be captured.

Measurement of illumination distribution: The illumination distribution can be measured by using a home-built scanner (e.g., XY-axis stepping motors) mounted with an optical powermeter and sensor (e.g., Thorlabs, PM100D and S120 VC). To reproduce the illumination environment in which the light is incident right below the array-lens, the optical power distribution with an overall area of approximately 50×50 mm$^2$ and a step size of approximately 0.5 mm at the imaging distance b of approximately 68.75 mm can be measured from the projection images. The measured results can be plotted to the 2D illumination distribution, for instance by MATLAB code.

Printing experiment: The kaleidoscopic printing system can be implemented by modifying an optical platform in a conventional projection-based SLA that contains, for example, a DMD-based digital optical engine (e.g., Wintech PRO4500). In one non-limiting instance, the DMD-based digital optical engine can include a 405-nm LED source, delivering optics, an optical diffuser (e.g., Thorlabs, DG100X100-1500), and an array-lens as shown in FIG. 1A. The initial condition of the minimum feature size R and areal build size $A_S$ for the projection-based SLA machine used in conjunction with the described printing experiment were approximately 50 µm and approximately 64×40 mm$^2$, respectively. According to the above relationship of conventional projection-based SLA methods, $A_S = k \cdot R^2$, the constant k is calculated to $1.02 \times 10^6$. To investigate the scalable kaleidoscopic printing, two types of array-lens with different focal lengths and overall size can be used, denoted as Lens1 (e.g., RPC Photonics, MLA-S1000-f5.5, overall size 50×50 mm$^2$) and Lens2 (e.g., Flexible Optical B.V., APO-P(GB)-P250-F0,57, overall size 25×25 mm$^2$). For Lens1, the ideal $k_{\it eff}$ is calculated to $1.35 \times 10^8$ by the relationship of $k_{\it eff} = k/D^2$, where D is 0.087. For Lens2, since the Abbe diffraction-limited spot size (λ/(2NA)~0.91 µm) is larger than the effective planar resolution (R×D=0.42 µm), 0.91 µm can be considered as $R_{\it eff}$. Thus, an ideal $k_{\it eff}$ can be calculated to $3.10 \times 10^9$ by applying the relationship of $k_{\it eff} = A_S/R_{\it eff}^2$. In some instances, all printing experiments can be performed at the imaging distance b of approximately 68.75 mm. The photocurable material can comprise 1,6-hexanediol diacrylate (e.g., HDDA, Sigma-Aldrich) with about 2% (w/w) phenylbis (e.g., 2,4,6-trimethylbenzoyl) phosphine oxide (e.g., Irgacure 819, Sigma-Aldrich) initiator and 1-phenylazo-2-naphthol (e.g., Sudan 1, Sigma-Aldrich) a UV-absorber which can be varied in concentration from approximately in the range of about 0.05% to about 0.5% (w/w). In some instances, commercial 3D printing resins (e.g., IC142-Investment Resin, Colorado photopolymer solutions) can be used to implement kaleidoscopic printing of the photopolymerization process.

Volumetric 3D Printing with Photopolymerization Curing

To the extent others have tried volumetric additive manufacturing that uses a spatial light modulator to modify the phase and/or intensity of a laser beam or the like to create a patterned profile, the phase or intensity modulation approach associated with such techniques can be costly and complex. Existing techniques use a single laser source and do not employ projection methods for pattern generation.

Volumetric printing can provide an alternative approach to layer-by-layer curing of a three-dimensional printed object. Volumetric 3D printing can include curing an entire 3D printed object at once. This can be achieved by intersecting beams of light that are shone through a photopolymer into a volume to be cured into a 3D object to control parts of the volume that receive high energy dosage. This can result in a controlled solidification or curing throughout the entire volume. An exposure time can be calculated based on the photopolymer used and energy dosage required for solidification of the volume. The volumetric printing method described herein allows for the use of a digital light processing (DLP) chip to output a pattern of light, although any means of patterning can work. While some initial testing was performed with a static image, it is possible to utilize the volumetric 3D printing approach with patterns that change over time to improve the resultant object part.

Figure 6:
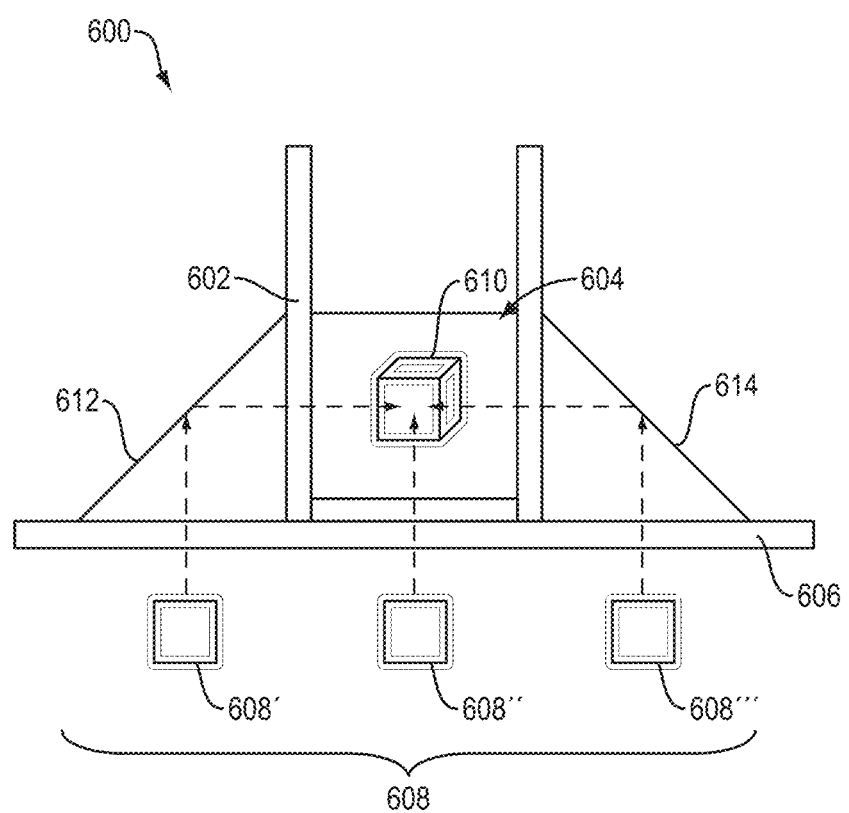
FIG. 6 is a schematic overview of one exemplary embodiment of a volumetric 3D printer.

FIG. 6 schematically illustrates an embodiment of a volumetric 3D printer 600 in accordance with the present disclosure. A tank 602 holding a photopolymer 604 can be placed on a base 606. In some embodiments, the base 606 can be made from glass or other material through which light can pass. The photopolymer 604 can be a transparent resin through which light can pass. In some embodiments, the photopolymer 604 can be a 1,6-Hexanediol Diacrylate (HDDA) based photopolymer with approximately 0.05 wt % photoinitiator (PI). A hollow glass cube can be used as the tank 602. Beams of light can be directed through the photopolymer 604 such that the beams of light intersect to control the parts of the volume of photopolymer 604 that receive high-energy dosage. In this manner, a controlled solidification throughout the entire 3D part to be printed can be achieved.

A projector (not shown) can output a multiple digital mask image 608, which can be directed through the base 606 in a controlled manner and into the volume of photopolymer 604. More particularly, the multiple digital mask image 608 can include a plurality of sub-displays. In some instances, the projector can directly output a mask image 608 that includes a plurality of sub-displays. Additionally or alternatively, the output of the projector can be manipulated, for example by passing the projector output through an array-lens as described above, to create a plurality of sub-displays. Light from one or more of the plurality of sub-displays can be routed in such a way that controlled patterns of light enter the volume of photopolymer 604 from various angles. Points in the volume of photopolymer 604 at which light intersect gather a higher dosage of energy per unit voxel, thus permitting these areas of the 3D volume of photopolymer to cure while other areas of the photopolymer 604 remain in liquid form. A digital light processing chip (DLP) can be used as a projector to output a pattern of light. Other manners of patterning and projecting light are also possible.

As shown in FIG. 6, the digital mask image 608 includes hollow square pattern of light sub-displays 608', 608", 608'". The light from each sub-display can be routed in such a way that controlled patterns of light enter the volume of photopolymer 604 from various angles and superimpose in a region 610 of the photopolymer. For example, a first prism mirror can direct light from the sub-display 608' and a second prism mirror 614 can direct light from the sub-display 608'" such that light from the sub-displays 608', 608", 608'" enter the photopolymer 604 at orthogonal angles. In the region 610, where multiple image superimposition occurs, the photopolymer 604 can be cured as a result of the higher-dosage of energy received. Accordingly, a 3D object in the shape of the region 610 can be cured in a volumetric manner. Exposure time of the light beams to the photopolymer 604 can be calculated based on the particular photopolymer used and the energy dosage required for solidification. While FIG. 6 includes three square pattern sub-displays, a different number and/or pattern of sub-displays can be used. Moreover, while a static mask image 604 is illustrated, it is possible to utilize the volumetric printing approached described herein with light-patterns (i.e., digital mask images) that change over time. Such dynamic mask image can improve the resultant 3D printed object.

Figure 7:
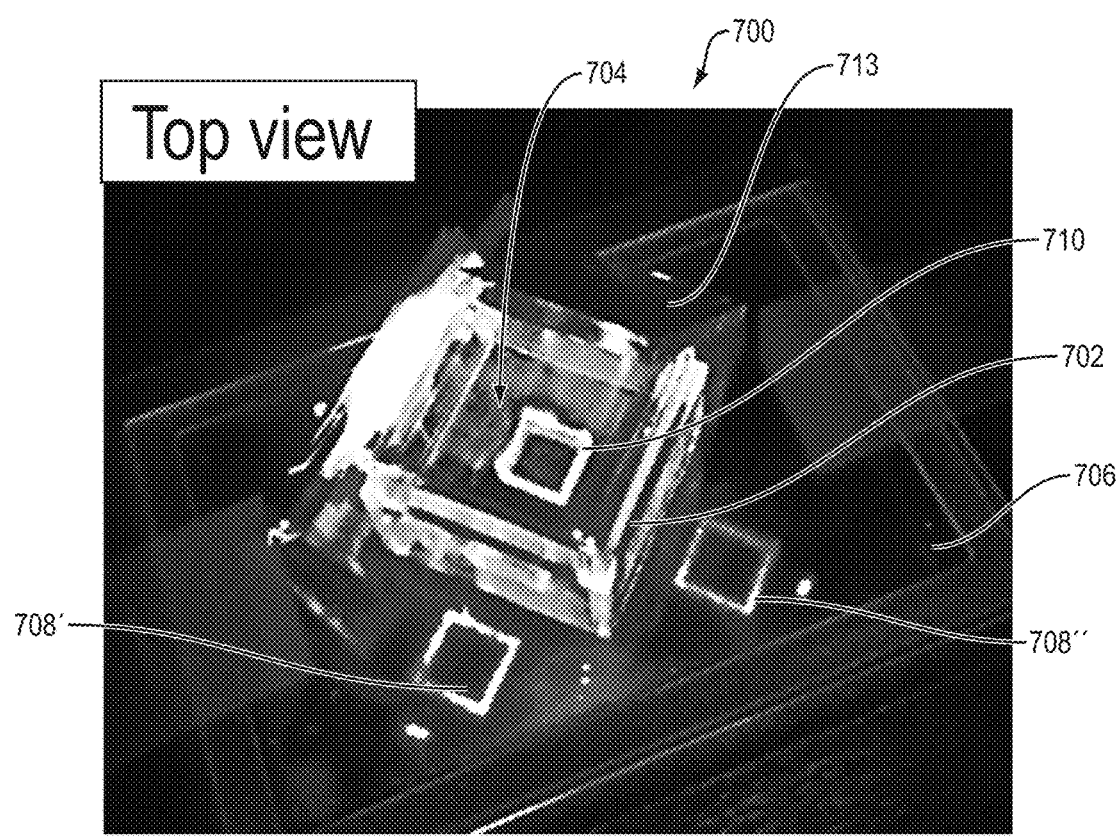
FIG. 7 is top view of one exemplary of a volumetric 3D printer.
Figure 8:
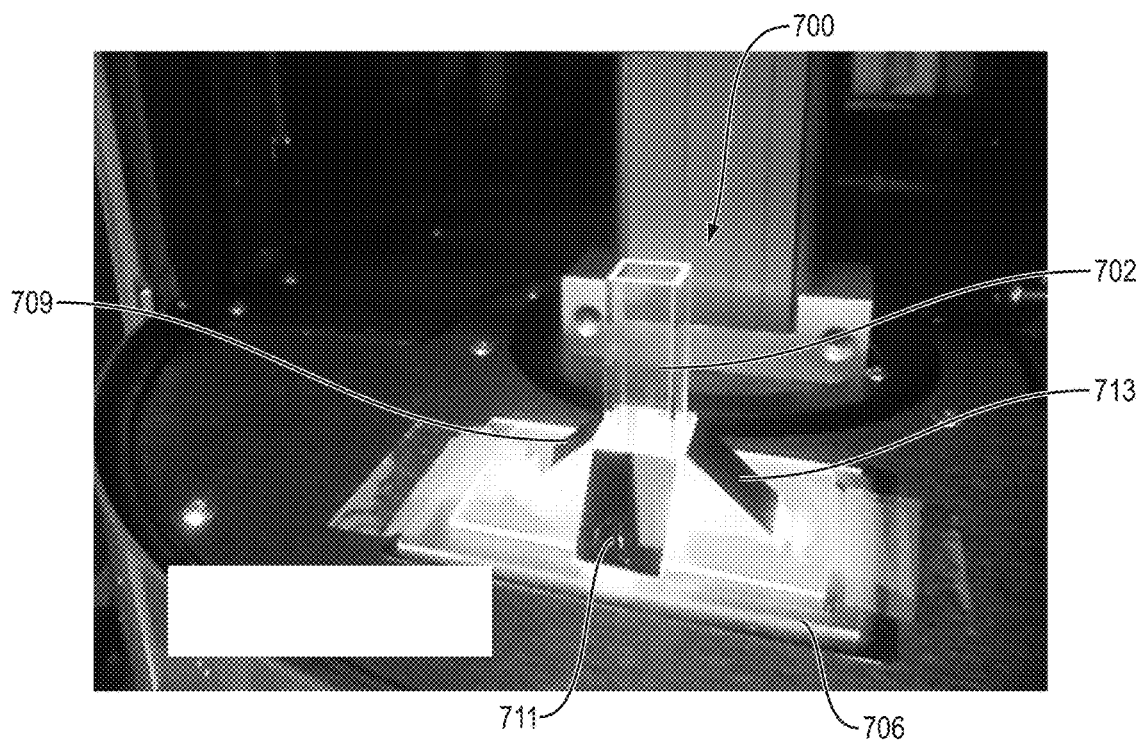
FIG. 8 is a side view of the volumetric 3D printer of FIG. 7.

FIGS. 7 and 8 show a top view and a side view, respectively, of an embodiment of a volumetric 3D printer 700. The volumetric 3D printer 700 can be based on an Autodesk Ember printer with a 405 nm output. A tank 702 can hold a volume of photopolymer 704 therein and can be placed on a base 706. Three hollow-square light pattern sub-displays (708' and 708", visible in FIG. 7) can be reflected into the volume of photopolymer 704 at different angles using mirrors 709, 711, and 713. The light beams reflected into the photopolymer 704 can superimpose on one another at a region 710 in the photopolymer to cure and form a 3D object. In the illustrated embodiment, the region 710 can be cured to form a hollow cube. While three mirrors 709, 711, 713 are used in the illustrated embodiment of FIGS. 7 and 8, the number of mirrors used to direct and control light from one or more sub-display can be dependent, at least in part, on the desired number of light pattern sub-displays to be reflected into photopolymer volume.

Figures 9, 10:
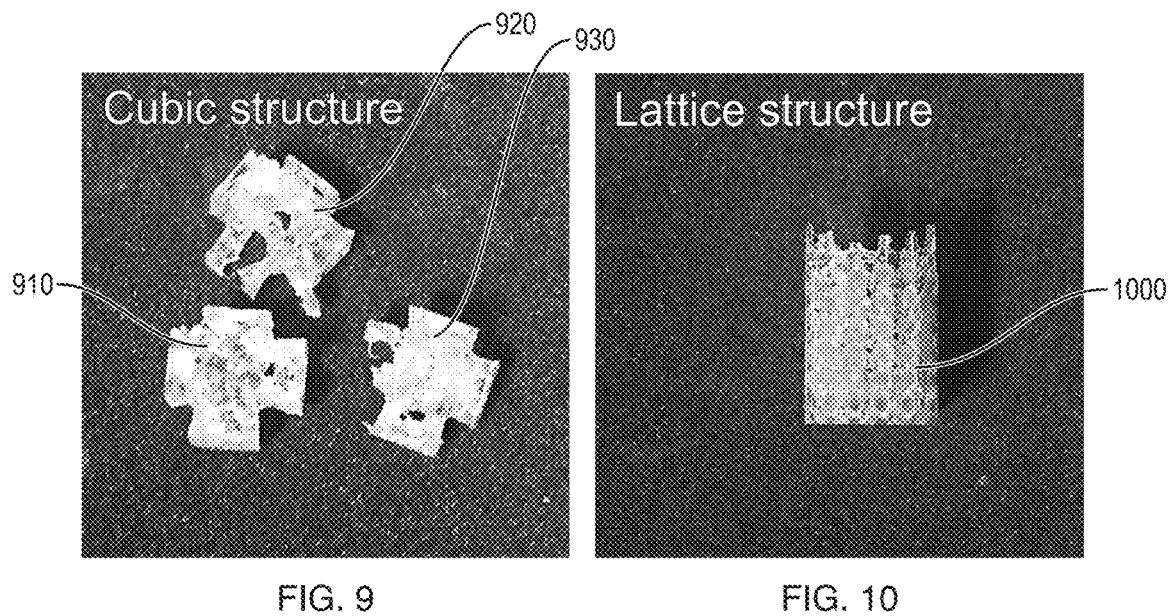
FIG. 9 is a top view of one exemplary embodiment of cubic structures formed using volumetric 3D printers and techniques as provided for herein, such as the volumetric 3D printer of FIG. 7.
FIG. 10 is a top view of one exemplary embodiment of a lattice structure formed using volumetric 3D printers and techniques as provided for herein, such as the volumetric 3D printer of FIG. 7.

FIGS. 9 and 10 show images of preliminary structures printed in accordance with the volumetric 3D printers and printing methods described herein. FIG. 9 shows three volumetrically printed cubic structures 910, 920, 930, while FIG. 10 shows a volumetrically printed lattice structure 1000. Each of the structures shown in FIGS. 9 and 10 illustrate preliminary results of a 3D volumetric printer before either method or software optimization is employed, such optimization being derivable from the present disclosures, including as detailed further below.

The example of volumetrically curing a hollow cube happens to be simple and symmetric. For arbitrary shapes to be cured, optimization software can be used. A linear-optimization script can be created, for example in *Julia* code, that can read in a point-cloud and optimize the patterns to yield a resultant part as close to the desired part as possible. The more patterned images that are used, the more control the software has over the outcome. As the number of patterned images move to infinity, a continuous ring of images can be imagined. A way of accomplishing this in practice can be to use a conical mirror.

Figure 11:
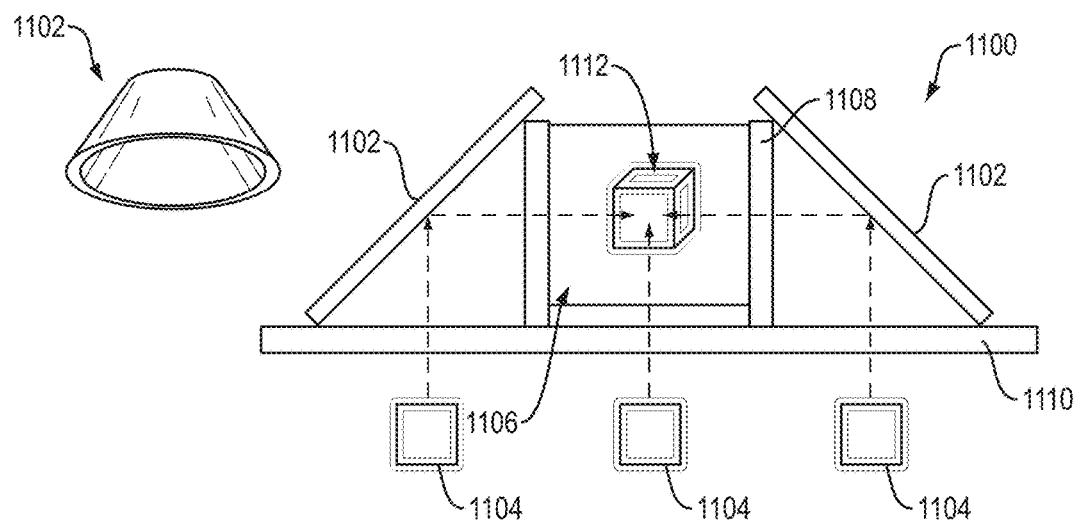
FIG. 11 is a schematic overview of another exemplary embodiment of a volumetric 3D printer.
Figure 12:
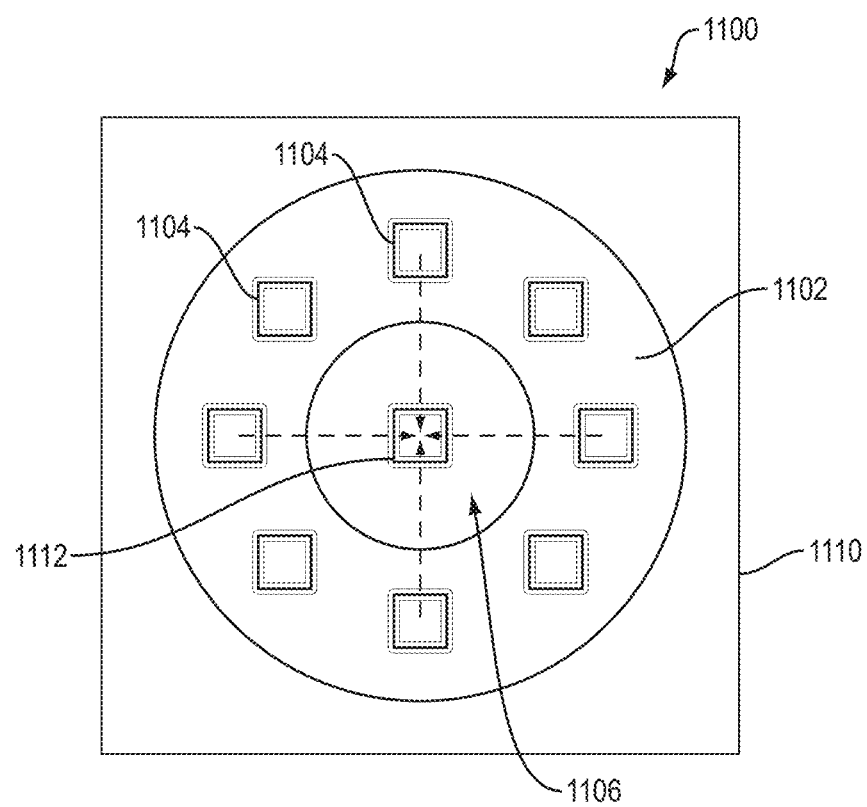
FIG. 12 is a top view of the volumetric 3D printer of FIG. 11.

FIGS. 11 and 12 schematically illustrate an embodiment of a 3D volumetric printer 1100 with a conical mirror 1102 that can be used to direct light from a multiple sub-display patterns into a volume of photopolymer 1106. In some embodiments, the photopolymer 1106 can be a high viscosity resin with low photoinitiator (PI) concentration. The volume of photopolymer 1106 can be disposed within a tank 1108 that is placed on a base 1110. As described above, sub-display light patterns, including hollow-square patterns 1104', 1104", 1104'" visible in the view shown in FIG. 11, can be projected through the base 1110 and directed into the photopolymer 1106 in a controlled manner such that the sub-display light patterns superimpose at a region 1112 in the volume of photopolymer 1106. As discussed above, a high-dosage of energy can be delivered to the photopolymer where the light beams from the sub-display light patterns intersect, thereby curing the region 1112 of intersection to form a 3D printed component. FIG. 12 shows a top view of the printer 1100 of FIG. 11. As can be seen, the conical mirror 1102 can permit high multiples of sub-display patterns 1104 to be directed such that light beams from the sub-display patterns superimpose at the region 1112 in the photopolymer 1106.

In conjunction with any of the above-described 3D volumetric printers and printing methods, an optimization code can be supplied that factors in properties of the photopolymer that allow it to incorporate the light intensity drop-off as light moves through the photopolymer resin. The values used can include the initial light intensity coming off the projector and the light penetration depth through the photopolymer. The software can take into account that the energy dosage from a beam of light will fall according to an exponential function as it moves through the medium. It can also factor in light divergence, as perfectly collimated light is not a reality. Accordingly, such software can be used to optimize aspects of the printer and methods disclosed herein, for example, output of the projector, exposure time of one or more light beams to the photopolymer, path of the light pattern from one or more sub-display, etc., to print and cure a 3D object in an efficient and effective manner.

Applications of 3D Volumetric Printing

In general, the form of 3D printing used here is best suited for clear resins with low light intensity drop-offs. Arbitrary designs can be produced in seconds, lending this type of technology to a wide variety of uses. Many large companies now have rapid prototyping labs that employees can utilize. Often, parts are submitted and retrieved the next day. However, this technology permits fabrication to occur fast enough to submit a part and obtain it soon after. Setup includes uploading an image to process through optimization (approximately 5 minutes with some current software, although in other instances it may be faster) and pouring photopolymer into a clear tank. While setup time may not be reduced much, the printing time itself is.

While this technology can be applied to a number of uses. One use is with respect to tissue engineering. 3D printed cellular constructs tend to be limited by print speed, as cells cannot survive for long while a part is being printed. With curing times in the seconds, the present disclosure enables new types of cells to be printed into soft structures like photocurable hydrogels. Another use can be in trauma applications that require fast prints. For instance, surgical guides in cranial repair could be printed quickly after an MRI or CT scan. Yet another use can be in a periodic structure that benefits from high surface-to-volume ratio, such as, for example, a catalytic converter. By improving the production rate of parts in a printer, less printers can be used overall to achieve the same or improved throughput and/or the same number of printers can be used with improved throughput.

One skilled in the art will appreciate further features and advantages of the disclosures based on the provided for descriptions and embodiments. Accordingly, the inventions are not to be limited by what has been particularly shown and described. All publications and referenced cited herein, including those provided for in Appendix A, are expressly incorporated herein by reference in their entirety.

What is claimed is:

1. A system for three-dimensional printing, comprising:
   a chamber configured to have a curable resin disposed therein;
   an optical diffuser;
   an image generator configured to project one or more images onto the optical diffuser;
   an array-lens configured to receive the one or more images projected onto the optical diffuser, replicate at least one image of the one or more images to create a plurality of output images, and project the plurality of output images into the chamber to produce a kaleidoscopic imaging pattern on a curable resin disposed in the chamber; and
   a curing component configured to cure the curable resin disposed in the chamber such that a resulting three-dimensional printed object is printed based on the kaleidoscopic imaging pattern produced on the curable resin disposed in the chamber,
   wherein the image generator is configured to adjust the one or more images projected onto the optical diffuser to control a superposition of the plurality of output images or an overlap of the plurality of output images on the curable resin disposed in the chamber to produce the kaleidoscopic imaging pattern on the curable resin, the kaleidoscopic imaging pattern comprising periodical imaging patterns.

2. The system of claim 1, wherein the system is configured to allow a distance between the optical diffuser and the array-lens to be adjustable.

3. The system of claim 2, further comprising an adjustable stage to which the array-lens is coupled, the adjustable stage being configured to move the array-lens longitudinally to adjust the distance along a z-axis between the optical diffuser and the array-lens.

4. The system of claim 1, wherein the array-lens is further configured to at least one of superposition the plurality of output images or overlap the plurality of output images on the curable resin disposed in the chamber to produce the kaleidoscopic imaging pattern on the curable resin, the kaleidoscopic imaging pattern comprising periodical imaging patterns.

5. The system of claim 1, wherein the array-lens comprises a plurality of lenses, each lens of the plurality of lenses being configured to generate an image of the plurality of output images, the image being a reduced size in comparison to a corresponding image projected by the image generator.

6. The system of claim 1,
   wherein the system is further configured such the array-lens is configured to produce a plurality of kaleidoscopic imaging patterns over time on a curable resin disposed in the chamber, and
   wherein the curing component is configured to cure the curable resin disposed in the chamber such that the resulting three-dimensional printed object is printed based on the plurality of kaleidoscopic imaging patterns produced on the curable resin disposed in the chamber.

7. The system of claim 1, further comprising a reflector disposed between the image generator and the optical diffuser, the reflector being configured to reflect one or more images from the image generator to the optical diffuser.

8. The system of claim 1, further comprising a digital controller configured to operate at least one of the image generator or the array-lens such that the kaleidoscopic imagining pattern is a digitally controlled kaleidoscopic imaging pattern.

9. The system of claim 1, further comprising a controller configured to control the curing component to selectively cure parts of a volume of the curable resin disposed in the chamber based on the kaleidoscopic imaging pattern.

10. The system of claim 1,
    wherein the one or more images projected by the image generator comprises an array, and
    wherein the plurality of output images comprise an output array such that the system provides for array-to-array imaging.

11. The system of claim 1, wherein the resulting three-dimensional printed object comprises a plurality of microfiber arrays, with arrays of the plurality of microfiber arrays having a diameter approximately in the range of about 1 micrometer to about 20 micrometers.

12. The system of claim 11, wherein a surface area of the resulting three-dimensional printed object on which the plurality of microfiber arrays are disposed is approximately in the range of about 625 millimeters$^2$ to about 2500 millimeters$^2$.

13. The system of claim 1, wherein the chamber is configured to remain stationary while the resulting three-dimensional printed object is formed.

14. The system of claim 1, wherein the system is devoid of scanning optics modules.

\* \* \* \* \*